US012632051B2

(12) United States Patent
Yanks et al.

(10) Patent No.: US 12,632,051 B2
(45) Date of Patent: May 19, 2026

(54) SYSTEMS AND METHODS FOR RECORDING ROBOT MISSIONS

(71) Applicant: Boston Dynamics, Inc., Waltham, MA (US)

(72) Inventors: Joseph Hufford Yanks, Medford, MA (US); Samuel Frank Seifert, Watertown, MA (US); Mario Attilio Bollini, Somerville, MA (US); Leland John Hepler, Lexington, MA (US)

(73) Assignee: Boston Dynamics, Inc., Waltham, MA (US)

( * ) Notice: Subject to any disclaimer, the term of this patent is extended or adjusted under 35 U.S.C. 154(b) by 355 days.

(21) Appl. No.: 17/994,831

(22) Filed: Nov. 28, 2022

(65) Prior Publication Data

US 2023/0297118 A1    Sep. 21, 2023

Related U.S. Application Data

(60) Provisional application No. 63/301,817, filed on Jan. 21, 2022.

(51) Int. Cl.
*G05D 1/00* (2024.01)
(52) U.S. Cl.
CPC .................................. *G05D 1/0221* (2013.01)
(58) Field of Classification Search
CPC ... G05D 1/0221; G05D 1/0044; B60W 10/00; B60W 60/0027; B60W 40/08;
(Continued)

(56) References Cited

U.S. PATENT DOCUMENTS 6,904,334 B2    6/2005  Asano et al.
8,060,344 B2   11/2011  Stathis
(Continued)

FOREIGN PATENT DOCUMENTS

WO    WO 2008/060689      5/2008
WO    WO 2021/211251     10/2021
(Continued)

OTHER PUBLICATIONS

Scheper, "Behavior Trees for Evolutional Robotics Reducing the Reality Gap." Jun. 18, 2014, 197 pages.
(Continued)

*Primary Examiner* — Fadey S. Jabr
*Assistant Examiner* — Paula L Schneider
(74) *Attorney, Agent, or Firm* — Knobbe, Martens, Olson & Bear, LLP

(57) ABSTRACT

Aspects of the present disclosure provide techniques to undo a portion of a mission recording of a robot by physically moving the robot back through the mission recording in reverse. As a result, after the undo process is completed, the robot is positioned at an earlier point in the mission and the user can continue to record further mission data from that point. The portion of the mission recording that was performed in reverse can be omitted from subsequent performance of the mission, for example by deleting that portion from the mission recording or otherwise marking that portion as inactive. In this manner, the mistake in the initial mission recording is not retained, but the robot need not perform the entire mission recording again.

28 Claims, 13 Drawing Sheets

(58) Field of Classification Search
CPC .............. B60W 40/04; B60W 30/085; B60W
2900/00; B60W 2556/55; B60W 2556/50;
B60W 2554/4041; B60W 2554/4046;
B60W 2554/4029; B60W 2554/4026;
B60W 2552/50; B60W 2540/22; B60W
2520/04; B60W 2510/08; B60W 2420/54;
B60W 2300/34; B60W 2050/0004; B60W
20/30; B60W 50/80; B60W 30/0953;
B60W 30/095; B60W 2040/0809; B60W
10/196; B60W 10/184; B60W 2756/10;
B60W 2554/802; B60W 2554/80; B60W
2552/53; B60W 2552/40; B60W
2050/0014; B60W 30/0956; B60W
2050/143; B60W 2710/083; B60W
2710/08; B60W 2556/65; B60W 20/20;
B60W 10/26; B60W 40/105; B60W
40/09; B60W 2510/18; B60W 2420/408;
B60W 50/14; B60W 2710/06; B60W
2556/45; B60W 2540/18; B60W
2540/043; B60W 2540/30; B60W
2520/105; B60W 30/00; B60W 30/09;
B60W 20/12; B60W 2710/20; B60W
2552/15; B60W 2554/00; B60W 50/082;
B60W 50/0098; B60W 50/0097; B60W
10/11; B60W 2420/403; B60W 20/40;
B60W 2710/18; B60W 2556/10; B60W
2510/244; B60W 20/14; B60W 2540/10;
B60W 10/02; B60W 2520/10; B60W
10/08; B60W 10/06; B60W 20/00; B60W
10/18; B60W 10/20; B60W 10/04; B60W
10/10; B60W 30/18127; B60W 10/30;
B60W 10/101; B60W 10/119; B60W
10/12; B60W 10/182; B60W 10/198;
B60W 10/22; B60W 10/24; B60W 10/28;
B60W 20/10; B60W 20/11; B60W 20/13;
B60W 20/50; B60W 30/02; B60W 30/06;
B60W 2030/082; B60W 30/14; B60W
30/10; B60W 30/18; B60W 30/18009
USPC ........................................................ 701/23
See application file for complete search history.

(56) References Cited

U.S. PATENT DOCUMENTS

| | | | |
|---|---|---|---|
| 8,410,732 B2 | 4/2013 | Kassow et al. |
| 8,594,844 B1 | 11/2013 | Gal |
| 8,614,559 B2 | 12/2013 | Kassow et al. |
| 8,725,273 B2 | 5/2014 | Lenser et al. |
| 8,779,715 B2 | 7/2014 | Kassow et al. |
| 8,874,261 B2 | 10/2014 | Hein et al. |
| 8,929,603 B1 | 1/2015 | Maali et al. |
| 9,592,912 B1 | 3/2017 | Michini et al. |
| 9,747,698 B2 | 8/2017 | Stathis |
| 9,770,823 B2 | 9/2017 | Huang |
| 9,858,712 B2 | 1/2018 | Stathis |
| 9,876,993 B2 | 1/2018 | Sablak et al. |
| 10,155,166 B1 | 12/2018 | Taylor et al. |
| 10,410,328 B1 | 9/2019 | Liu et al. |
| 11,331,799 B1 | 5/2022 | Shafer |
| 11,372,408 B1 | 6/2022 | Webster et al. |
| 11,416,003 B2 | 8/2022 | Whitman et al. |
| 11,537,130 B2 | 12/2022 | Gaschler |
| 11,712,802 B2 | 8/2023 | Chestnutt et al. |
| 11,787,050 B1 | 10/2023 | Kaehler et al. |
| 11,797,016 B2 | 10/2023 | Seifert et al. |
| 12,094,195 B2 | 9/2024 | Komoroski |
| 12,151,380 B2 | 11/2024 | Whitman et al. |
| 12,304,083 B2 | 5/2025 | Zheng et al. |
| 12,346,116 B2 | 7/2025 | Seifert et al. |
| 2002/0169733 A1 | 11/2002 | Peters, II et al. |
| 2002/0183896 A1 | 12/2002 | Ogure et al. |
| 2004/0193321 A1 | 9/2004 | Anfindsen |
| 2004/0199302 A1 | 10/2004 | Pillar et al. |
| 2005/0041839 A1 | 2/2005 | Saitou et al. |
| 2005/0126144 A1 | 6/2005 | Koselka et al. |
| 2005/0222713 A1 | 10/2005 | Kawabe et al. |
| 2009/0052740 A1 | 2/2009 | Sonoura |
| 2010/0036527 A1 | 2/2010 | Matsunaga et al. |
| 2011/0231016 A1 | 9/2011 | Goulding |
| 2011/0264265 A1 | 10/2011 | Kanemoto |
| 2012/0121161 A1 | 5/2012 | Eade et al. |
| 2012/0155775 A1 | 6/2012 | Ahn et al. |
| 2012/0158183 A1 | 6/2012 | Lim et al. |
| 2012/0197464 A1 | 8/2012 | Wang et al. |
| 2012/0280087 A1 | 11/2012 | Coffman et al. |
| 2013/0231779 A1 | 9/2013 | Purkayastha et al. |
| 2013/0338525 A1 | 12/2013 | Allen |
| 2014/0129027 A1 | 5/2014 | Schnittman |
| 2014/0336848 A1 | 11/2014 | Saund et al. |
| 2015/0269439 A1 | 9/2015 | Versace et al. |
| 2015/0296142 A1 | 10/2015 | Cappel-Porter et al. |
| 2016/0188977 A1 | 6/2016 | Kearns et al. |
| 2017/0329347 A1 | 11/2017 | Passot et al. |
| 2017/0358201 A1 | 12/2017 | Govers et al. |
| 2018/0141562 A1 | 5/2018 | Singhal |
| 2018/0181137 A1 | 6/2018 | Choi et al. |
| 2018/0236654 A1 | 8/2018 | Mozeika et al. |
| 2018/0364045 A1 | 12/2018 | Williams et al. |
| 2019/0086894 A1 | 3/2019 | Tenorth |
| 2019/0184572 A1 | 6/2019 | Hayashi |
| 2019/0185186 A1 | 6/2019 | Li |
| 2019/0307106 A1 | 10/2019 | Hartung et al. |
| 2020/0012239 A1 | 1/2020 | Yamamoto |
| 2020/0070343 A1 | 3/2020 | Thomaz et al. |
| 2020/0174484 A1 | 6/2020 | Eoh et al. |
| 2020/0206918 A1 | 7/2020 | Sun |
| 2021/0041243 A1 | 2/2021 | Fay et al. |
| 2021/0041878 A1 | 2/2021 | Seifert et al. |
| 2021/0181750 A1 | 6/2021 | Gogna et al. |
| 2021/0206367 A1 | 7/2021 | Liu et al. |
| 2021/0318687 A1 | 10/2021 | Seifert et al. |
| 2021/0346557 A1 | 11/2021 | Brooks et al. |
| 2022/0057812 A1* | 2/2022 | Al ........................ G05D 1/0274 |
| 2022/0083058 A1* | 3/2022 | Passot .................. G05D 1/0246 |
| 2022/0083061 A1 | 3/2022 | Xie et al. |
| 2022/0083076 A1 | 3/2022 | Maeda |
| 2022/0113745 A1 | 4/2022 | Panigrahi et al. |
| 2022/0130147 A1 | 4/2022 | Courteville et al. |
| 2022/0138612 A1 | 5/2022 | Vengertsev et al. |
| 2022/0139027 A1 | 5/2022 | Luo et al. |
| 2022/0187828 A1 | 6/2022 | Miyagawa |
| 2022/0193905 A1 | 6/2022 | Berard et al. |
| 2022/0194245 A1 | 6/2022 | Gonana et al. |
| 2022/0237910 A1 | 7/2022 | Hirai et al. |
| 2022/0241980 A1 | 8/2022 | Bollini et al. |
| 2022/0258356 A1 | 8/2022 | Chi et al. |
| 2022/0305657 A1 | 9/2022 | Hong et al. |
| 2022/0383128 A1 | 12/2022 | Gonzales et al. |
| 2022/0388170 A1 | 12/2022 | Merewether |
| 2022/0388174 A1 | 12/2022 | Stathis et al. |
| 2022/0390950 A1 | 12/2022 | Yamauchi |
| 2023/0015335 A1* | 1/2023 | Gao ...................... G05D 1/0221 |
| 2023/0016514 A1 | 1/2023 | Zheng et al. |
| 2023/0055206 A1 | 2/2023 | Zheng et al. |
| 2023/0087057 A1 | 3/2023 | Wang et al. |
| 2023/0107289 A1 | 4/2023 | Maeda et al. |
| 2023/0125422 A1 | 4/2023 | Tsuzaki |
| 2023/0215024 A1 | 7/2023 | Huang |
| 2023/0400863 A1 | 12/2023 | Chen et al. |
| 2023/0418302 A1 | 12/2023 | Seifert et al. |
| 2023/0418305 A1 | 12/2023 | Chestnutt et al. |
| 2024/0061436 A1 | 2/2024 | Tsuzaki et al. |
| 2024/0087738 A1 | 3/2024 | Wang et al. |
| 2024/0160194 A1 | 5/2024 | Bakhshmand et al. |
| 2024/0377843 A1 | 11/2024 | Ryde et al. |
| 2025/0196345 A1 | 6/2025 | Rice et al. |
| 2025/0284284 A1 | 9/2025 | Seifert et al. |

(56)                 References Cited

U.S. PATENT DOCUMENTS

FOREIGN PATENT DOCUMENTS

| WO | WO 2022/256818 | 12/2022 |
| WO | WO 2023/140928 | 7/2023 |

OTHER PUBLICATIONS

International Search Report and Written Opinion received in Application No. PCT/US2022/051064, mailed Mar. 29, 2023, 10 pages.
International Search Report and Written Opinion received in Application No. PCT/US2021/022928, mailed Jun. 1, 2021, 10 pages.
Echegoyen et al., "Visual Servoing of Legged Robots," Journal of Mathematical Imaging and Vision, Kluwer Academic Publishers, vol. 42, No. 2-3, dated Apr. 29, 2011, pp. 196-211.
Girshick, "Fast R-CNN," Computer Vision and Pattern Recognition, arXiv:1504.08083 [cs.CV] version 2, dated Sep. 27, 2015 in 9 pages.
Hosoda et al., "Vision-Based Servoing Control for Legged Robots," Proceedings of the 1997 IEEE International Conference on Robotics and Automation Albuquerque, New Mexico, vol. 4, dated Apr. 4, 1997, pp. 3154-3159.
Hutchinson et al., "A Tutorial on Visual Servo Control," IEEE Transactions on Robotics and Automation, vol. 12, No. 5, dated Oct. 1996, pp. 651-670.
Rublee et al., "ORB: an efficient alternative to SIFT or SURF," IEEE 2011 International Conference on Computer Vision, dated Nov. 6, 2011, pp. 2564-2571.
International Search Report and Written Opinion received in Application No. PCT/US2022/072714, mailed Sep. 19, 2022, 18 pages.
"Anybotics Introduces End-to-End Robotic Inspection Solution," video screen shots taken from https://www.youtube.com/watch?v=g3odef0EAFA, Apr. 21, 2021, downloaded Apr. 3, 2025, 16 pages.
"ANYbotics Introduces End-to-End Robotic Inspection Solution," https://www.anybotics.com/news/anybotics-introduces-end-to-end-robotic-inspection-solution/, Apr. 21, 2021, printed Apr. 9, 2025, 11 pages.
"Guide to Industrial Inspection Robots: Identifying the Task you Want to Automate," https://www.anybotics.com/news/how-to-hire-an-industrial-inspection-robot-part-1/, Mar. 21, 2023, printed Apr. 9, 2025, 15 pages.
"Anybotics, Cognite & Accenture Enable Real End-to-End Robotic Inspection Solutions," https://www.anybotics.com/news/anybotics-cognite-accenture-enable-real-end-to-end-robotic-inspection-solutions/, May 30, 2022, printed Apr. 9, 2025, 13 pages.
"ANYmal Robots Inspecting Petronas' Offshore Platform (Webinar)," video screen shots taken from https://www.youtube.com/watch?v=aymdpFsdgbA, Jan. 22, 2021, downloaded Apr. 9, 2025, 19 pages.
"ANYmal X—Robotic Inspection in Ex-Rated Zones," video screen shots taken from https://vimeo.com/744482989, Aug. 30, 2022, downloaded Apr. 9, 2025, 13 pages.
"ANYmal @ ERL Emergency Robotics 2017," video screen shots taken from https://www.youtube.com/watch?v=qrJIMze_xhQ, Oct. 2, 2017, downloaded Apr. 9, 2025, 4 pages.
Gulalkari et al., Object following control of six-legged robot using Kenect Camera. In 2014 International Conference on Advances in Computing, Communications and Informatics (ICACCI) Sep. 24, 2014 (pp. 758-764). IEEE.
International Search Report and Written Opinion received in Application No. PCT/US2023/084269, mailed May 7, 2024, 15 pages.
Lakrouf et al., "Moving Obstacles Detection and Camera Pointing for Mobile Robot Applications," In Proceedings of the 3rd International Conference on Mechatronics and Robotics Engineering Feb. 8, 2017 (pp. 57-62).

* cited by examiner

*Initial Mission Recording*
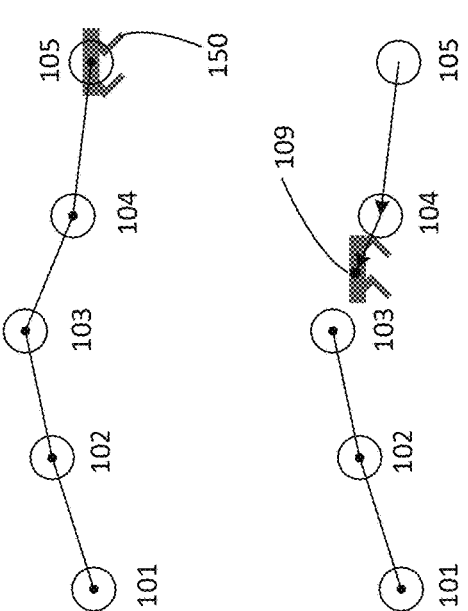
FIG. 2A
UNDO
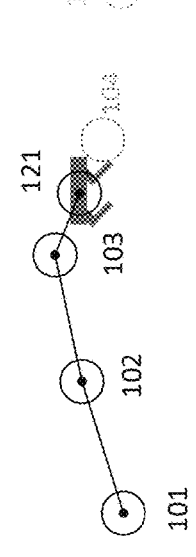
FIG. 2B
*Corrected Mission Recording*
FIG. 2C
*Further Mission Recording*
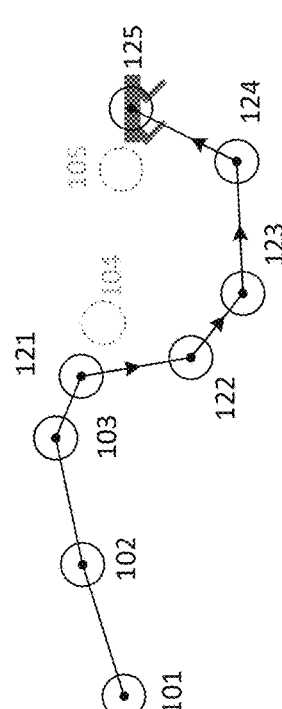
FIG. 2D

*Initial Mission Recording*

UNDO

*Corrected Mission Recording*

*Corrected Mission Recording (alternate to FIG. 4C)*

*Initial Mission Recording*

**511
Action**

507    506    505    504    503    502    501

521

UNDO

DELETE 504    503    502    501

*Corrected Mission Recording*

507    506    511    505    504    503    502    501

UNDO Button
610

SYSTEMS AND METHODS FOR RECORDING ROBOT MISSIONS

CROSS REFERENCE TO RELATED APPLICATIONS

This application claims the benefit under 35 U.S.C. § 119(e) of U.S. Provisional application Ser. No. 63/301,817, filed Jan. 21, 2022, and entitled, "SYSTEMS AND METHODS FOR RECORDING ROBOT MISSIONS," the disclosure of which is incorporated by reference in its entirety.

BACKGROUND

A robot is generally a reprogrammable and multifunctional manipulator, often designed to move material, parts, tools, or specialized devices through variable programmed motions for performance of tasks. Robots may be manipulators that are physically anchored (e.g., industrial robotic arms), mobile robots that move throughout an environment (e.g., using legs, wheels, or traction-based mechanisms), or some combination of a manipulator and a mobile robot. Robots are utilized in a variety of industries including, for example, manufacturing, warehouse logistics, transportation, hazardous environments, exploration, and healthcare.

Some robots are used to navigate environments to perform a variety of tasks or functions. These robots are often operated to perform a mission by navigating the robot through an environment. The mission is sometimes recorded so that the robot can again perform the mission at a later time. In some missions, a robot both navigates through and interacts with the environment. The interaction sometimes takes the form of gathering data using one or more sensors.

SUMMARY

According to some aspects, a method is provided of operating a robot to generate a mission recording of a mission, the method comprising using at least one processor recording, to an initial mission recording, data associated with a first set of one or more operations of the mission, in response to a user request to perform an undo process determining a second set of one or more operations that will undo at least a portion of the initial mission recording, and operating the robot to perform the second set of one or more operations, and producing a corrected mission recording in response to operating the robot to perform the second set of one or more operations.

In some implementations, the method further comprises recording data associated with a third set of one or more operations to the corrected mission recording according to user input.

In some implementations, the method further comprises operating the robot to perform the third set of one or more operations recorded to the corrected mission recording.

In some implementations, operating the robot to perform the second set of one or more operations comprises moving the robot from a current location of the initial mission recording to a prior location of the initial mission recording.

In some implementations, operating the robot to perform the second set of one or more operations results in the robot returning to an earlier state of the robot produced while operating the robot to perform the first set of one or more operations.

In some implementations, the second set of one or more operations include one or more movement operations.

In some implementations, the initial mission recording comprises data describing a route, and the second set of one or more operations are configured to operate the robot in a backwards direction along the route.

In some implementations, the initial mission recording comprises data describing a route, and the second set of one or more operations are configured to turn the robot around and operate the robot in a forward direction along the route.

In some implementations, the data describing the route comprises data describing one or more waypoints.

In some implementations, the initial mission recording comprises a user command to move the robot from a first location to a second location, and the second set of one or more operations are configured, at least in part, to move the robot from the second location to the first location.

In some implementations, the method comprises receiving a plurality of user commands to operate the robot in the mission, recording the data associated with the first set of one or more operations to the initial mission recording based on the plurality of user commands, and operating the robot to perform the first set of one or more operations.

In some implementations, the user request to perform the undo process comprises receiving a first user input indicating a start of the undo process, and receiving a second user input indicating an end of the undo process, and the robot is operated to perform the second set of one or more operations during a period between receiving the first user input and receiving the second user input.

In some implementations, the first user input comprises depressing a button, and the second user input comprises releasing the button.

In some implementations, the portion of the initial mission recording describes one or more actions to be performed by the robot during which the robot gathers data, and the second set of one or more operations comprises one or more operations that delete data gathered by the robot during recording of the initial mission recording.

In some implementations, the method further comprises displaying a prompt, via a graphical user interface, indicating that the data gathered by the robot during recording of the initial mission recording will be deleted, and waiting for a predetermined period of time between displaying the prompt and deleting the data gathered by the robot during recording of the initial mission recording.

In some implementations, the method further comprises operating the robot to reposition itself according to the initial mission recording subsequent to operating the robot to perform the second set of one or more operations.

In some implementations, the robot is at a first location subsequent to operating the robot to perform the first set of one or more operations, and the method further comprises operating the robot to move to the first location in response to determining that the robot is unable to successfully perform the second set of one or more operations.

In some implementations, the at least a portion of the initial mission recording is a first portion of the initial mission recording and a remainder of the initial mission recording is a second portion of the initial mission recording, and the corrected mission recording comprises the second portion of the initial mission recording but not the first portion of the initial mission recording.

In some implementations, the at least a portion of the initial mission recording is a first portion of the initial mission recording and a remainder of the initial mission recording is a second portion of the initial mission recording, and the corrected mission recording comprises the first portion and second portion of the initial mission recording and an indication that the first portion has been deleted.

In some implementations, the corrected mission recording comprises data associated with at least one operation not described by the initial mission recording.

According to some aspects, a system is provided comprising at least one processor, and at least one non-transitory computer readable medium comprising instructions that, when executed by the at least one processor, perform a method of operating a robot to generate a mission recording of a mission, the method comprising recording, to an initial mission recording, data associated with a first set of one or more operations of the mission, in response to a user request to perform an undo process determining a second set of one or more operations that will undo at least a portion of the initial mission recording, and operating the robot to perform the second set of one or more operations, and producing a corrected mission recording in response to operating the robot to perform the second set of one or more operations.

In some implementations, the method further comprises recording data associated with a third set of one or more operations to the corrected mission recording according to user input.

In some implementations, the method further comprises operating the robot to perform the third set of one or more operations recorded to the corrected mission recording.

In some implementations, operating the robot to perform the second set of one or more operations comprises moving the robot from a current location of the initial mission recording to a prior location of the initial mission recording.

In some implementations, operating the robot to perform the second set of one or more operations results in the robot returning to an earlier state of the robot produced while operating the robot to perform the first set of one or more operations.

In some implementations, the second set of one or more operations include one or more movement operations.

In some implementations, the initial mission recording comprises data describing a route, and the second set of one or more operations are configured to operate the robot in a backwards direction along the route.

In some implementations, the initial mission recording comprises data describing a route, and the second set of one or more operations are configured to turn the robot around and operate the robot in a forward direction along the route.

In some implementations, the data describing the route comprises data describing one or more waypoints.

In some implementations, the initial mission recording comprises a user command to move the robot from a first location to a second location, and the second set of one or more operations are configured, at least in part, to move the robot from the second location to the first location.

In some implementations, the method comprises receiving a plurality of user commands to operate the robot in the mission, recording the data associated with the first set of one or more operations to the initial mission recording based on the plurality of user commands, and operating the robot to perform the first set of one or more operations.

In some implementations, the user request to perform the undo process comprises receiving a first user input indicating a start of the undo process, and receiving a second user input indicating an end of the undo process, and the robot is operated to perform the second set of one or more operations during a period between receiving the first user input and receiving the second user input.

In some implementations, the first user input comprises depressing a button, and the second user input comprises releasing the button.

In some implementations, the portion of the initial mission recording describes one or more actions to be performed by the robot during which the robot gathers data, and second set of one or more operations comprises one or more operations that delete data gathered by the robot during recording of the initial mission recording.

In some implementations, the method further comprises displaying a prompt, via a graphical user interface, indicating that the data gathered by the robot during recording of the initial mission recording will be deleted, and waiting for a predetermined period of time between displaying the prompt and deleting the data gathered by the robot during recording of the initial mission recording.

In some implementations, the method further comprises operating the robot to reposition itself according to the initial mission recording subsequent to operating the robot to perform the second set of one or more operations.

In some implementations, the robot is at a first location subsequent to operating the robot to perform the first set of one or more operations, and the system further comprises operating the robot to move to the first location in response to determining that the robot is unable to successfully perform the second set of one or more operations.

In some implementations, the at least a portion of the initial mission recording is a first portion of the initial mission recording and a remainder of the initial mission recording is a second portion of the initial mission recording, and the corrected mission recording comprises the second portion of the initial mission recording but not the first portion of the initial mission recording.

In some implementations, the at least a portion of the initial mission recording is a first portion of the initial mission recording and a remainder of the initial mission recording is a second portion of the initial mission recording, and the corrected mission recording comprises the first portion and second portion of the initial mission recording and an indication that the first portion has been deleted.

In some implementations, the corrected mission recording comprises data associated with at least one operation not described by the initial mission recording.

According to some aspects, a method is provided of operating a robot collecting a mission recording of a mission, the method comprising prior to completing collection of the mission recording, operating the robot to undo a portion of the mission recording at least in part by moving the robot from a current location of the mission to a prior location of the mission in response to a request to perform an undo process.

In some implementations, the method further comprises generating an updated mission recording based on the portion of the mission recording.

In some implementations, the portion of the mission recording is a first portion and a remainder of the mission recording is a second portion of the mission recording, and the updated mission recording comprises the second portion of the mission recording but not the first portion of the mission recording.

In some implementations, the portion of the mission recording is a first portion and a remainder of the mission recording is a second portion of the mission recording, and the updated mission recording comprises the first portion and second portion of the mission recording and an indication that the first portion has been deleted.

In some implementations, operating the robot to undo a portion of the mission recording comprises determining one or more operations that correspond to performing the portion of the first mission recording in reverse.

In some implementations, the mission recording comprises data describing a route, and the one or more operations are configured to operate the robot in a backwards direction along the route.

In some implementations, the mission recording comprises data describing a route, and the one or more operations are configured to turn the robot around and operate the robot in a forward direction along the route.

In some implementations, the data describing the route comprises data describing one or more waypoints.

In some implementations, the method comprises receiving a plurality of user commands to operate the robot in the mission, recording the mission recording based on the plurality of user commands, and operating the robot to perform the mission recording based on the plurality of user commands.

In some implementations, the request to perform an undo process comprises receiving a first user input indicating a start of the undo process, and receiving a second user input indicating an end of the undo process, and the robot is operated undo the portion of the mission recording during a period between receiving the first user input and receiving the second user input.

In some implementations, the first user input comprises depressing a button, and the second user input comprises releasing the button.

In some implementations, the portion of the mission recording describes one or more actions to be performed by the robot during which the robot gathers data, and operating the robot to undo the portion of the mission recording comprises deleting data gathered by the robot during recording of the mission recording.

In some implementations, the method further comprises displaying a prompt, via a graphical user interface, indicating that the data gathered by the robot during recording of the mission recording will be deleted, and waiting for a predetermined period of time between displaying the prompt and deleting the data gathered by the robot during recording of the mission recording.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 2A-2D depict a second example of an undo process for undoing part of a mission recording that includes waypoints, according to some embodiments;

FIGS. 4A-4D depict an example of an undo process for a mission recording, wherein the mission recording includes commands, according to some embodiments;

DETAILED DESCRIPTION

Figures 1A, 1B, 1C, 1D:
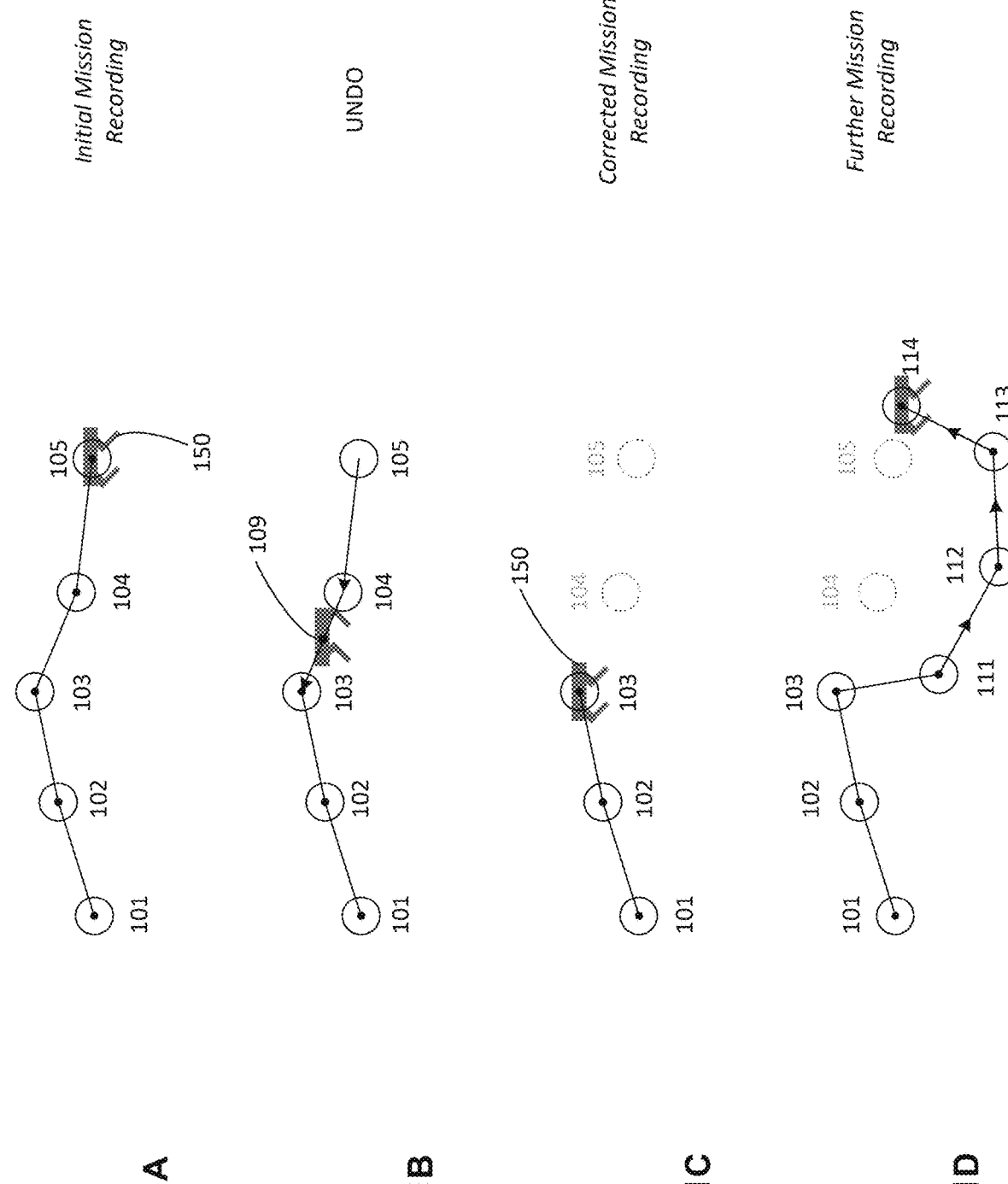
FIGS. 1A-1D depict a first example of an undo process for undoing part of a mission recording that includes waypoints, according to some embodiments.

A robot may be operated by a user to perform a mission. In some cases, a system may produce data describing the mission (also referred to herein as a "mission recording") as the robot moves around an environment, and may store the mission recording for later use. The mission recording can be later replayed by the system to operate the robot to perform the mission again without needing user input. As a result, a user may operate a robot in a mission one time to define a mission recording, which can be later played back on command to prompt the robot to repeat the mission autonomously. In some cases, operation of the robot may be provided via a 'what-you-see-is-what-you-get' (WYSIWYG) recording interface, so that a user can watch the robot perform the mission as it is controlled and observe how the mission is proceeding while the mission recording is generated.

As one illustrative example of such a mission, a robot may move through an unmanned site. To record the mission, a user may navigate the robot through the site (or a duplicate of the site) and perform desired actions such as moving objects or obtaining sensor data that indicates what is happening at the site. Some examples of obtaining sensor data may entail taking photographs, video, collecting samples, or performing chemical analyses. The mission recording generated as a result of this one-time user-driven process can later be replayed as many times as desired to autonomously operate a robot (the same robot or a different robot) at the unmanned site to perform the mission by navigating through the same route and performing the same actions as during the mission recording process.

In general, a mission may be defined by user input that provides instructions to the robot. The instructions may include instructions to move the robot, or instructions for the robot to perform actions that cause the robot to interact with the environment. A mission recording may store data that allows for replay of the mission, and may for instance include a map of the environment and data indicating how the robot should traverse the environment according to the mission. In some cases, a mission recording may comprise a set of waypoints that define a route for the robot to take through the environment during replay of the mission recording. The waypoints can, for example, be defined during recording of the mission by automatically capturing a waypoint periodically (e.g., every meter) as the user operates the robot through the environment. When the mission is replayed, the mission recording can operate the robot to move through the waypoints to attempt to recreate the route taken by the user during the recording process.

In some cases, a user may make a mistake when recording a mission. For example, a user may move the robot in the wrong direction, may incorrectly utilize a sensor (e.g., take a picture with the wrong camera), or may otherwise operate the robot to perform some operation that is different to that intended or that is determined during mission recording to be desirable to omit from subsequent performance of the mission. There are various options for addressing such a mistake.

One option for addressing a mistake in a mission recording is to simply retain the mistake. The mistake is then repeated each time the mission is repeated. The inventors have recognized that this option is undesirable, because repeating mistakes in subsequent performing of a mission may represent a waste of time and/or battery life of the robot. Also, retaining mistakes in a mission recording may lead to inaccurate performance of actions or may endanger the robot by having the robot traverse a path or perform an action that is hazardous.

A second option for addressing a mistake in a mission recording is to repeat the entire mission recording. The robot is returned to its initial starting point and the entire navigation and performance of actions is completed again, this time avoiding the mistake in the initial mission recording. This approach to addressing a mistake in a mission recording may represent a significant waste of resources. Missions can span significant distance (e.g., several kilometers in length) and time (e.g., tens of minutes to hours). The amount of time required to repeat the entire mission recording can therefore be significant. In short, mistakes in a mission recording can be extremely costly, especially if they occur towards the end of a mission.

A third option for addressing a mistake in a mission recording is to edit the mission recording after completion to remove any erroneous portions. This option, however, requires special training in the software used to edit a mission recording. In addition, correcting a mission recording in this way runs contrary to a desire to provide a WYSIWYG recording interface in which the user is able to perform the mission and have a visually-confirmed expectation of what the mission will look like when replayed autonomously.

Aspects of the present disclosure provide techniques to undo a portion of a mission recording of a robot by physically moving the robot back through the mission recording in reverse. As a result, after the undo process is completed, the robot is positioned at an earlier point in the mission and the user can continue to record further mission data from that point. The portion of the mission recording that was performed in reverse can be omitted from subsequent performance of the mission, for example by deleting that portion from the mission recording or otherwise marking that portion as inactive. In this manner, the mistake in the initial mission recording does not need to be retained (e.g., if storage space is limited), but the robot need not perform the entire mission recording again. Additionally, the user need not possess specialized mission recording editing skills to edit the mission recording after completion. The undo process may be initiated in response to user input, which causes the robot to begin physically moving back through the mission recording, and which may continue until further user input indicates the undo process is to stop. The undo process may support a WYSIWYG approach to mission recording, in which a user can pilot a robot through a mission and watch the robot move back through the mission recording during periods in which the undo process is active.

According to some embodiments, an undo process for undoing a portion of a mission recording may comprise working backwards from a most recent point in the mission recording and determining operations for the robot to perform that will have the effect of reversing the robot back through the portion of the mission that is to be undone. The operations to effectively reverse the robot back through the portion of the mission that is to be undone may be different from those operations that were used to control the robot through the portion of the mission that is to be undone. The operations to effectively reverse the robot back through the portion of the mission that is to be undone may further be different from simply performing in reverse the operations that were used to pilot the robot through the portion of the mission that is to be undone. For example, during initial mission recording a user may operate the robot to move around a corner, but then decide to undo this portion of the mission recording. During the undo process, the robot may move backwards (i.e., physically move in a reverse fashion, such as walking backwards) around the corner, or may instead turn around and move forwards around the corner to the point at which the mission recording is to begin again, then turn around again once the undo process finishes. In some cases, since a robot may traverse the environment based on data besides the mission recording (e.g., based on sensor data indicative of its surroundings), a route taken as a result of an undo process may differ from the route initially taken prior to the undo process.

Following below is additional description of various concepts related to, and embodiments of, techniques to undo a portion of a mission recording of a robot. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIGS. 1A-1D depict an example of an undo process according to aspects of the present disclosure, for a mission recording that includes waypoints, according to some embodiments. In the example of FIGS. 1A-1D, a robot 150 is piloted through an environment as part of a mission recording, and then a portion of that mission recording is undone via an undo process, as described above. As shown in FIG. 1A, an initial mission recording may be defined, at least in part, by five waypoints 101, 102, 103, 104 and 105, which are depicted as circles in the figures. That is, a user may have previously piloted the robot to move through the locations of waypoints 101, 102, 103, 104 and 105 (henceforth, waypoints 101-105) in that order, and the system controlling the robot may store information describing waypoints 101-105 in the mission recording. It may be noted that the user piloting the robot may not be aware of the waypoints or their location, but may be merely operating the robot along a route and the system controlling the robot may automatically generate and store the waypoints in the mission recording as the robot moves along the route (e.g., for simplicity of operation and/or interface seen by the user).

In the example of FIG. 1B, the user initiates an undo process when the robot 150 is at waypoint 105, or shortly thereafter. For example, the user may realize that the robot was incorrectly piloted to the location represented by waypoint 105, and should have instead made a right turn prior to that moment. Potential reasons for this situation may include encountering an impassable obstacle or other terrain at or near waypoint 105, encountering terrain that may not be safely traversable, encountering a hazard, or simple user error. As a result, the system controlling the robot begins to move the robot back along the route defined by the waypoints 101-105, as shown in FIG. 1B in which the motion of the robot is shown by the arrowed lines from waypoint 105 to waypoint 104, and from waypoint 104 to waypoint 103. The system controlling the robot may move the robot back along the route defined by the waypoints from 105 to 101 until the user indicates the undo process is to end.

The system controlling the robot during the undo process may move the robot back along the route defined by the waypoints 103-105 in any suitable way, including by moving the robot backwards, turning around and moving the robot forwards, or by moving the robot backwards for an initial period, then turning around and moving the robot forwards for the remainder of the undo process. These types of motion are described in further detail below in relation to FIG. 3. In the example of FIG. 1B, the robot is depicted as having turned around and moving forwards along the route, merely for purposes of illustration.

According to some embodiments, during the undo process, a user interface may present information to the user piloting the robot indicating the status of the robot during the undo process. For instance, a user interface may show a view from a camera of the robot so that the user can see the robot moving back along the route. Additionally, or alternatively, the user interface may show a map of the environment along with a current position of the robot (and, optionally, the route represented by the mission). In this manner, the user may be able to watch the progress of the undo process, and may decide when to stop the undo process. In some embodiments, the user interface may present the same or similar content during the undo process compared with when the mission is being recorded outside of an undo process. Examples of such an interface are described further below in relation to FIGS. 6A-6D.

In the example of FIG. 1B, when the robot reaches the location 109, the user indicates the undo process is to end, and the system controlling the robot produces a corrected mission recording, as shown in FIG. 1C. In the example of FIG. 1C, the system controlling the robot continues to move the robot to waypoint 103 since the undo process ended between two previously recorded waypoints, so that the robot is at waypoint 103 at the end of the undo process. That is, in some embodiments, when an undo process ends, the robot may be controlled to continue along the route defined by waypoints of the mission recording until the robot reaches the next waypoint, at which it stops. As an alternative, the system controlling the robot may instead generate a new waypoint at the location of the robot when the undo process ends, rather than continuing along the route to the next waypoint. An example of this approach is shown in FIGS. 2A-2D, which is described further below.

As a result of the undo process in the example of FIGS. 1A-1D, the corrected mission recording as shown in FIG. 1C includes only the waypoints 101, 102 and 103. The waypoints 104 and 105 may be absent from (e.g., deleted from)

the corrected mission recording, or may be included in the corrected mission recording and marked as inactive. As such, the waypoints 104 and 105 are shown in dotted lines in FIGS. 1C and 1D simply for purposes of illustration, and their presence in the drawings is not an indication that they are necessarily present in the corrected mission recording in any way. In some embodiments, the robot may be repositioned after the undo process ends so that it faces along the route (e.g., if the robot turned around and moved forward during the undo process, as shown in FIG. 1B). This approach is shown in FIG. 1C, with the robot 150 having been reoriented to face along the new route in the corrected mission recording, for purposes of illustration.

Subsequent to producing the corrected mission recording, the user may then pilot the robot through the mission as intended, having undone the portion of the mission recording corresponding to movement through waypoints 104 and 105. For example, as shown in FIG. 1D, the mission recording may subsequently include additional waypoints 111, 112, 113 and 114 generated by the user piloting the robot through a new route from the location represented by waypoint 103. Consequently, the undo process allowed the user to produce a desired mission recording as shown in FIG. 1D, in which the robot turned to the right after passing through the location represented by waypoint 103, instead of the initial erroneous path represented by waypoints 104 and 105.

As described above in connection with FIGS. 1A-1D, as part of the process of moving a robot along waypoints when undoing a portion of a mission recording, the robot may respond to a user indication to stop the undo process by either moving to the nearest prior waypoint or by creating a new waypoint. In the example of FIGS. 1B and 1C, the robot moved to the nearest prior waypoint (waypoint 103) in response to the user indication to stop the undo process. FIGS. 2A-2D illustrate an alternative operation. FIG. 2A is the same as FIG. 1A. In FIG. 2B, the robot is at location 109 when the user indicates that the undo process is to stop. The robot stops at that location instead of continuing to the next prior waypoint (waypoint 103) as in the example of FIG. 1B. The corrected mission recording shown in FIG. 2C contains a new waypoint 121 generated by the system controlling the robot, and which is recorded to the corrected mission recording. The waypoint 121 represents the location 109 of the robot when the undo process ended.

As with the example of FIGS. 1A-1D, subsequent to producing the corrected mission recording of FIG. 2C, the user may then pilot the robot through the intended mission, having undone the portion of the mission recording corresponding to movement through waypoints 104 and 105. For example, as shown in FIG. 2D, the mission recording may subsequently include additional waypoints 122, 123, 124 and 125 generated by the user piloting the robot through a new route from the location represented by waypoint 121.

Figure 3:
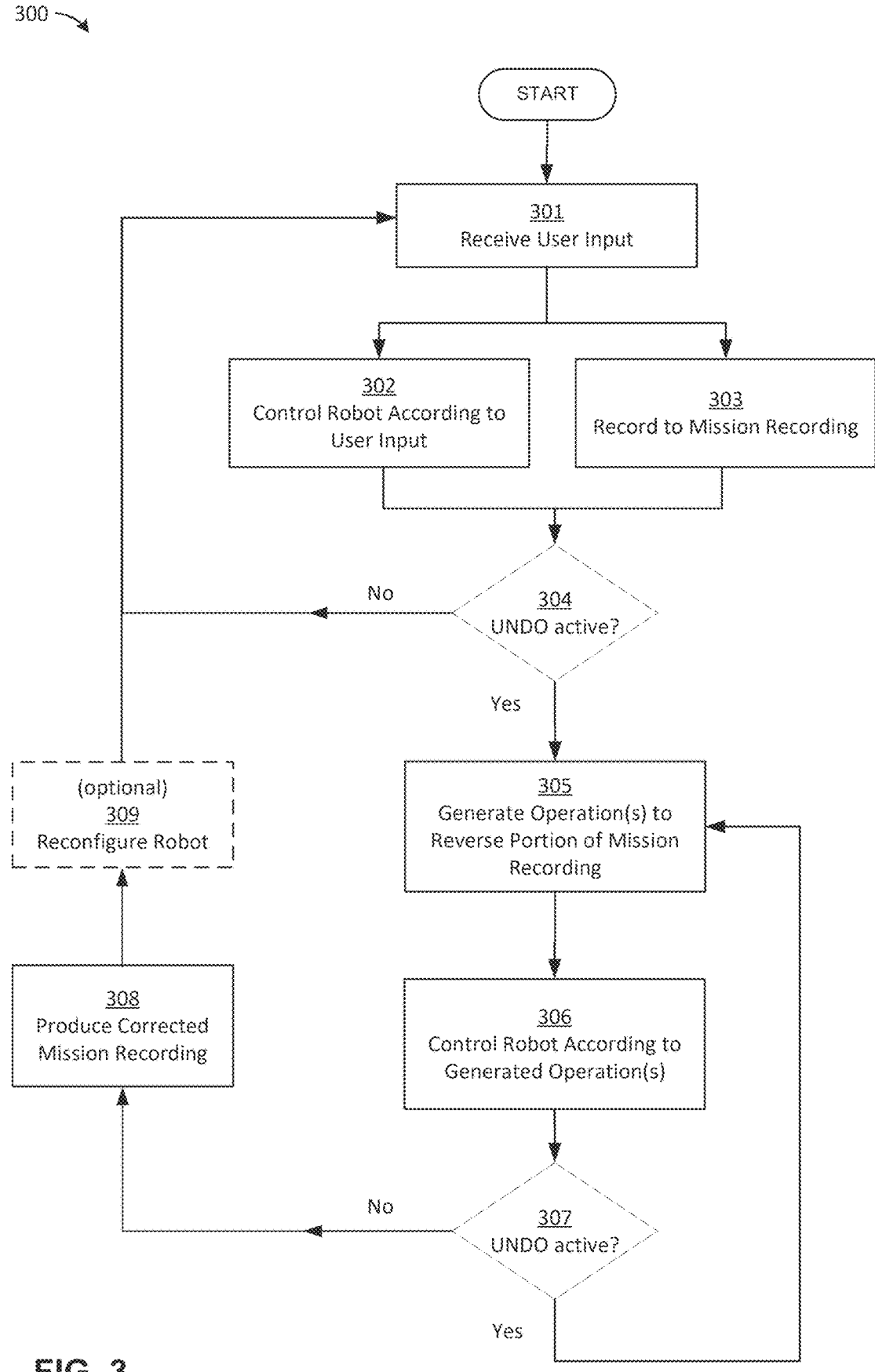
FIG. 3 is a flowchart of a method of controlling a robot to generate a mission recording of a mission, according to some embodiments.

FIG. 3 is a flowchart of a method of controlling a robot to generate a mission recording of a mission, according to some embodiments. Method 300 may be performed by a system based on user input provided to the system. User input may be provided to the system via one or more controllers connected to the system, and/or by the system receiving data indicative of user input from another system. In addition, the system performing method 300 may be configured to communicate with the robot so that the system can control the robot during the mission and, in some embodiments, receive data from the robot indicative of the robot's progress through the mission (e.g., location data and/or camera data). An example of a system suitable for performing method 300 is described further below in relation to FIG. 7.

Method 300 begins with act 301, in which user input is received to control the robot. The user input may be provided to control the robot during a mission, and may indicate to the robot to perform any of numerous acts, including moving (e.g., translational and/or rotational motion), interacting with an object (e.g., opening a door), and/or actions in which the robot utilizes one or more onboard sensors to obtain data from its environment. The user input may be provided to the system performing method 300 in any suitable form, and may be provided from any suitable device connected directly or indirectly to the system. In some embodiments, a user may provide input to an input device that transmits the user input to the system performing method 300. In some embodiments, a user may interact directly with an input device that is part of, or is directly connected to, the system performing method 300. Suitable input devices may include a handheld controller (an example of which is described below in relation to FIGS. 6A-6D), a keyboard, mouse, or combinations thereof. In some embodiments, an input device may comprise a screen that displays information regarding the robot during the mission.

According to some embodiments, user input received in act 301 may comprise navigational input that directs the robot to move in a particular direction during the mission. Navigational input may include absolute directional input (e.g., move north) and/or input relative to an orientation of the robot (e.g., move forward, move left, etc.). In some cases, the navigational input may be continuously provided during the motion (e.g., a stick on a controller may be held upwards to instruct the robot to move forwards so long as the stick is in that position), or navigational input may be discrete and may include instructions to move in a defined step (e.g., an instruction to move north 100 feet; an instruction to go to location A). In some embodiments, navigational input received in act 301 may include speed information conveyed through the control method (e.g., the extent to which an analog stick is moved in a direction may convey the speed to move in that direction) or explicitly conveyed (e.g., an instruction to move north 100 feet at a speed of 1 foot/second).

According to some embodiments, user input received in act 301 may instruct the robot to perform one or more actions. As referred to herein, an "action" refers to a process performed by the robot that acquires data of some kind. Illustrative examples of actions may include capturing an image (including visible light, x-ray and/or infrared imaging), measuring a quantity using an ambient sensor (e.g., ambient temperature, ambient humidity, ambient light level, ambient magnetic field), or measuring a quantity using a contact sensor that is controlled to touch an object of interest (e.g., measuring a current or voltage of an electrical wire, measuring the temperature of an object).

The user input received in act 301 may be used to both control the robot according to the user input in act 302, and to record data to the mission recording in act 303 to allow the mission to be replayed later.

In act 302, the system performing method 300 may control the robot according to the user input received in act 301, which may comprise generating appropriate data to send to the robot based on the user input, and sending that data to the robot. In general, to control the robot the user input may be converted into instructions to actuate the various parts of the robot to produce the type of control desired. The system performing method 300 may perform some or all of this conversion, such that the data sent to the robot by the system may comprise low level instructions to operate actuators of the robot, or may comprise higher level instructions to operate the robot in a particular way. In some embodiments, for instance, when the user input comprises navigational input, the system performing method 300 may supply data to a steerer of the robot instructing the robot to move, and the steerer of the robot may move the robot based on the received instructions and/or based on additional data stored by the robot. For example, the system performing method 300 may supply data to the steerer instructing the robot to walk forward, and the steerer may determine an appropriate way to operate the actuators to implement walking forward, taking into account the present configuration of the robot (e.g., leg position) while also avoiding obstacles that may lie in its path.

In act 303, the system performing method 300 may record data to a mission recording based on the user input received in act 301. The recorded data may include any suitable data that would allow system 300 (or another system) to replay the mission autonomously at a later time. In some embodiments, the recorded data may include some or all of the user input received in act 301. In some embodiments, the data recorded in act 303 may comprise one or more waypoints that describe a route that the robot should follow, and may optionally also include data indicating one or more actions that should be performed at particular locations along the route. It may be noted that, in general, the data recorded in act 303 may be different from the data sent to the robot to control the robot in act 302. When a given system accesses the mission recording to perform the recorded mission autonomously, the system may convert the mission into a series of operations to move the robot and perform any actions, and the system may generate and send data to the robot to perform these operations to replay the mission.

According to some embodiments, the data recorded to the mission recording in act 303 may include waypoints that represent locations in the environment through which the robot passes during control of the robot in act 302. In some embodiments, waypoints may be recorded in the mission recording at regular intervals, including at regular intervals in time (e.g., every 1 second, every 2 seconds, etc.) and/or at regular intervals of distance (e.g., every 1 meter traveled, every 5 steps traveled, etc.). The waypoints may be stored such that an order of the waypoints can be determined from the mission recording, and used to construct a route in which the waypoints are traversed in the intended order. Waypoint locations may be captured in any suitable way, such as using a location sensor on board the robot to report its position to the system performing method 300. In some embodiments, the robot may comprise a LIDAR sensor that may be operated to generate data indicating a position of the robot. In some embodiments, the robot may determine its position by capturing an image of a fiducial target, or by providing such an image to the system performing method 300, which can determine the position based on the fiducial target's appearance in the image.

In some embodiments, the data recorded to the mission recording in act 303 may comprise data describing edges between waypoints. Edges in the mission recording may represent how the robot moves between waypoints. The data describing the edges may include the relative pose of connected waypoints (e.g., the position and orientation of the robot at the connected waypoints) and/or any needed parameters describing how the robot should move along that edge. As one example, a mission recording may comprise data for one or more edges that traverse a staircase in an environment. This data may encode information about the stairs, such as the number of stairs traversed and the width of the staircase. In some embodiments, data describing an edge may describe a spatial corridor within which the robot is to be constrained while traversing the space between waypoints.

According to some embodiments, the data recorded to the mission recording in act 303 may include map data generated based on data received from the robot. As the robot moves through the environment, the robot may generate sensor data indicative of obstacles or other structures in the environment using one or more sensors (e.g., LIDAR). Map data based on this sensor data may be stored in the mission recording to further guide autonomous operation of the robot during a future replay of the mission. When map data is recorded to the mission recording in this manner but a portion of the mission that produced the map data is subsequently undone through an undo process as described herein, this map data may be retained, or may be deleted.

In act 304, the system performing method 300 determines whether input has been received to activate an undo process. If not, acts 301, 302 and 303 are repeated. As such, the mission recording may be progressively generated until input is provided to activate an undo process. While acts 301, 302 and 303 are shown as separate, sequential acts in the example of FIG. 3, it may be appreciated that each may be simultaneously performed on an ongoing basis during recording of a mission, with user input being received, for instance, while the robot is being controlled and the mission recording is being generated.

According to some embodiments, the input received to activate an undo process in act 304 may be produced by a user pressing a physical button, or clicking on a control within a user interface. In some embodiments, the input received to activate an undo process in act 304 may be produced by a user pressing and holding a physical button, with release of the button indicating subsequent input that will end the undo process. The latter approach may be particularly user friendly in that it allows a user to hold a single button to 'rewind' the mission and release the button when the robot has returned to a desired location. In some embodiments, such a button may be part of the same controller used to supply the user input in act 301.

Once an undo process has been activated in act 304, method 300 proceeds to act 305 and then act 306. So long as the undo process remains activated, method 300 repeats acts 305 and 306, as determined in act 307.

In act 305, one or more operations to reverse a portion of the mission recording are generated by the system performing method 300. Initially when performing act 305, this portion of the mission recording may comprise the most recently recorded portion of the mission recording with any suitable granularity. On subsequent passes through act 305 during the undo process (since acts 305 and 306 may be repeated so long as the undo process is activated), this portion may progressively move backwards through the mission recording so that the mission recording is performed in reverse, one portion at a time. In the example of FIG. 1B, for instance, an initial portion of the mission recording for which operations may be generated in act 305 may be the portion of the mission that traverses the robot from waypoint 104 to waypoint 105 (but in reverse, so that the operations move the robot from waypoint 105 to waypoint 104). Alternatively, the initial portion of the mission recording for which operations may be generated in act 305 may be a smaller distance along the edge between waypoint 105 to waypoint 104. Irrespective of the granularity of the portions, the mission recording may be worked through in reverse, with each portion being considered in turn, and one or more operations being generated in act 305 for each respective portion.

In act 306, the robot is controlled based on the one or more operations generated in act 305. It may be noted that this process may be comparable to a process wherein a given system accesses a mission recording to perform the recorded mission autonomously, as described above. The distinctions between that process and acts 305 and 306, is that in acts 305 and 306 the mission recording is performed in a reverse order, and only while the undo process is activated. Otherwise, both processes may convert the mission recording into a series of operations to move the robot, and may generate and send data to the robot to perform these operations.

Returning to act 305, in some embodiments a mission recording may be performed in reverse according to a series of waypoints stored by the mission recording, wherein the waypoints are traversed during the undo process in reverse order, beginning with the most recently generated waypoint. The examples of FIGS. 1A-1D and FIGS. 2A-2D depict such a process, for instance.

In some embodiments, a mission recording may be performed in reverse, at least in part, according to a series of commands provided by a user. The commands may represent high level movements, such as "go to location A." When undoing a mission recording that includes such commands, the system performing method 300 may perform an undo process by performing the navigational commands in reverse rather than directly traversing any waypoints that may have been previously recorded to the mission recording as a result of the navigational commands. When the undo process ends, as described below in relation to act 308, the robot may be operated to stop at its present location and the system performing method 300 may generate a new waypoint at that location. Alternatively, when the undo process ends, the robot may be operated so that the command currently being performed in reverse is completed, rather than stopping the robot part way through a command.

Figures 4A, 4B, 4C, 4D:
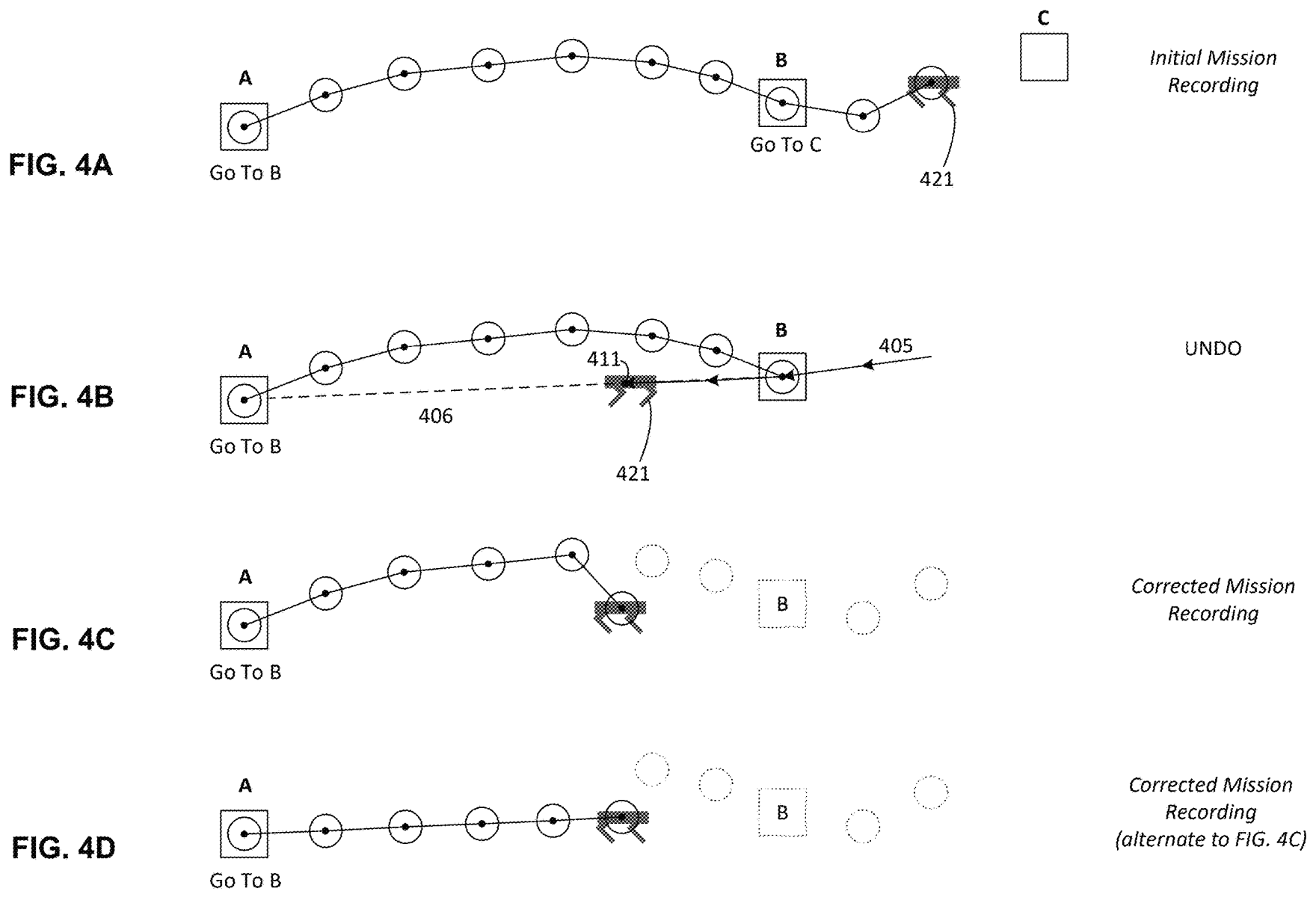

FIGS. 4A-4D depict an example of an undo process for a mission recording, wherein the mission recording includes commands, according to some embodiments. In the example of FIG. 4A, an initial mission recording includes a command to move the robot 421 from a location A to a location B, and a command to move the robot from location B to a location C, an initial part of which is shown in the figure. Waypoints may be generated along the route taken by the robot and stored in the mission recording. Subsequently, a user may initiate an undo process, causing the robot to travel back along the route previously taken, as shown in FIG. 4B.

In the example of FIG. 4B, instead of traversing the route according to the waypoints already stored by the mission recording, the robot 421 may instead attempt to take a direct route through the locations dictated by the user commands. That is, the robot may initially traverse (or attempt to traverse) a direct path from its present location to location B along path 405, then may initially traverse (or attempt to traverse) a direct path from location B to location A along path 406. In the example of FIG. 4B, the undo process ends when the robot is between location B and location A, at position 411.

As shown in the example of FIG. 4C, a corrected mission recording may be produced that includes a waypoint at location 411, along with any waypoints previously generated that are closer to location A than location 411. Alternatively, as shown in the example of FIG. 4D, a corrected mission recording may be produced to include a waypoint at location 411 along with intermediate waypoints generated along a path between location A and location 411. Intermediate waypoints may be generated, for instance, according to the techniques described in U.S. Patent Publication No. US2021/0041243, titled "Intermediate Waypoint Generator," which is hereby incorporated by reference in its entirety.

Alternatively to FIGS. 4C and 4D, the robot may instead be operated to continue to location A rather than stopping the robot part way through a command.

The example of FIGS. 4A-4D is provided as an example of an undo process in which performing a portion of a mission recording in reverse does not involve traversal of waypoints stored by the mission recording, or at least involves bypassing some of the waypoints stored by the mission recording. Other techniques to perform a portion of a mission recording in reverse may also be envisioned.

Moreover, it may be appreciated that, in practice, even when traversing a route in reverse according to waypoints, the robot may not precisely follow the same route as it followed during recording of the mission recording. For example, obstacles may be traversed differently during an undo process than during mission recording, or a walking robot's gait may be different during an undo process, leading to a slightly different route being taken. As such, when a robot is operated to return to a previously recorded waypoint at the end of an undo process (e.g., as in the example of FIG. 1C), the robot may not end up at the exact same location as when that waypoint was recorded.

Figures 8A, 8B, 8C:
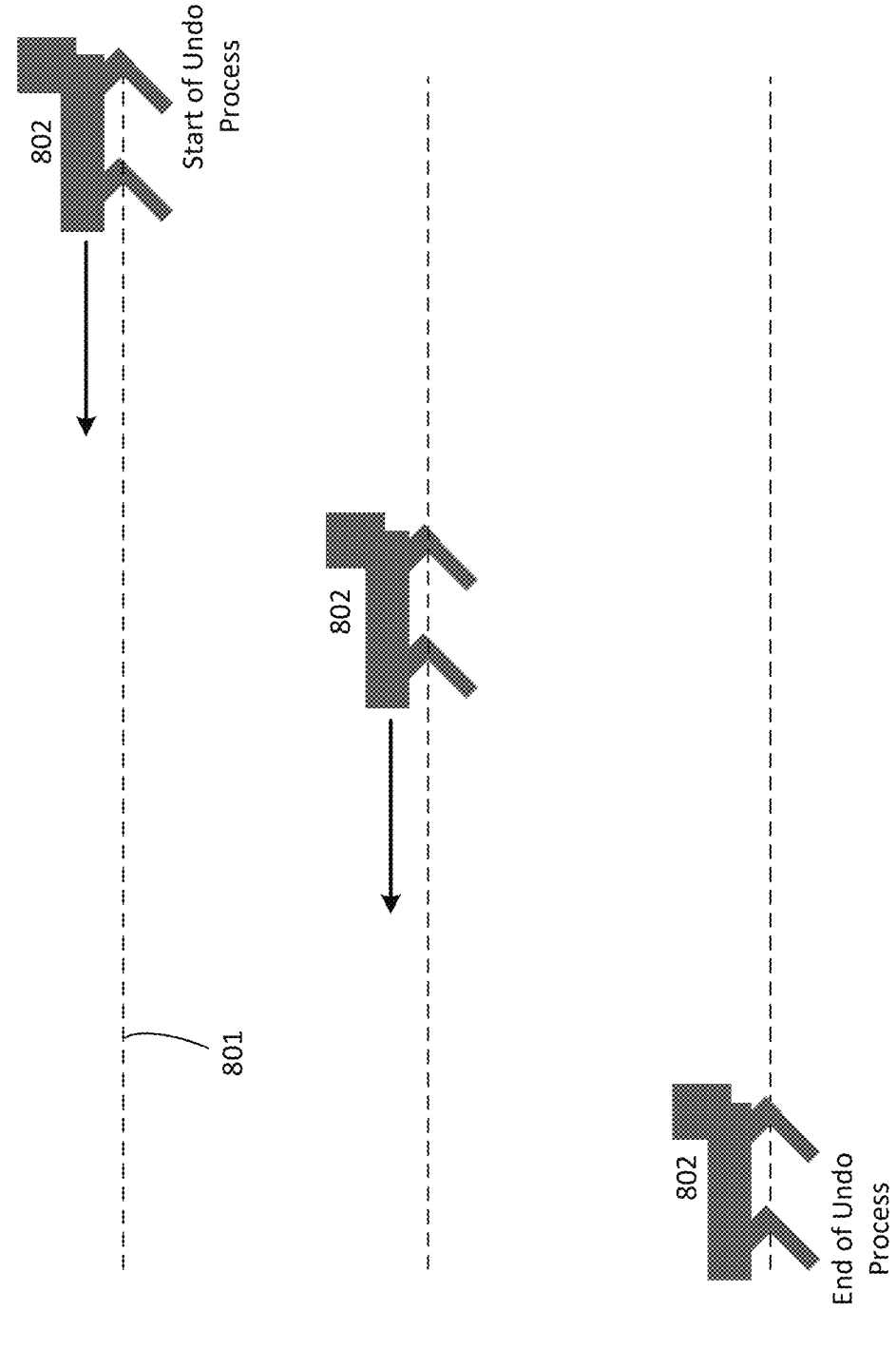
FIGS. 8A-8C depict an example of controlling a robot to move along a route during an undo process, during which the robot moves backwards, according to some embodiments.

With respect to any operations generated in act 305 in which the robot is reversed along a route, irrespective of whether this route is selected according to previously recorded waypoints or otherwise, any of several different strategies for moving a robot may be selected. In some embodiments, the system performing method 300 may generate operations to move the robot backwards along the route. That is, the robot may traverse the route without reorienting (or without substantially reorienting) the portions of the robot that are responsible for locomotion. For example, a robot that moves via a tread or track may be equally capable of moving forwards or backwards, and the operations generated in act 305 may control the robot to move backwards along the route during the undo process without reorienting the tread or track (so that the robot moves forward during recording, then moves backwards during the undo process). One example of this approach is shown in FIGS. 8A-8C, which depict a quadruped robot 802 controlled to move backwards along a route 801 during an undo process.

Figures 9A, 9B, 9C, 9D, 9E:
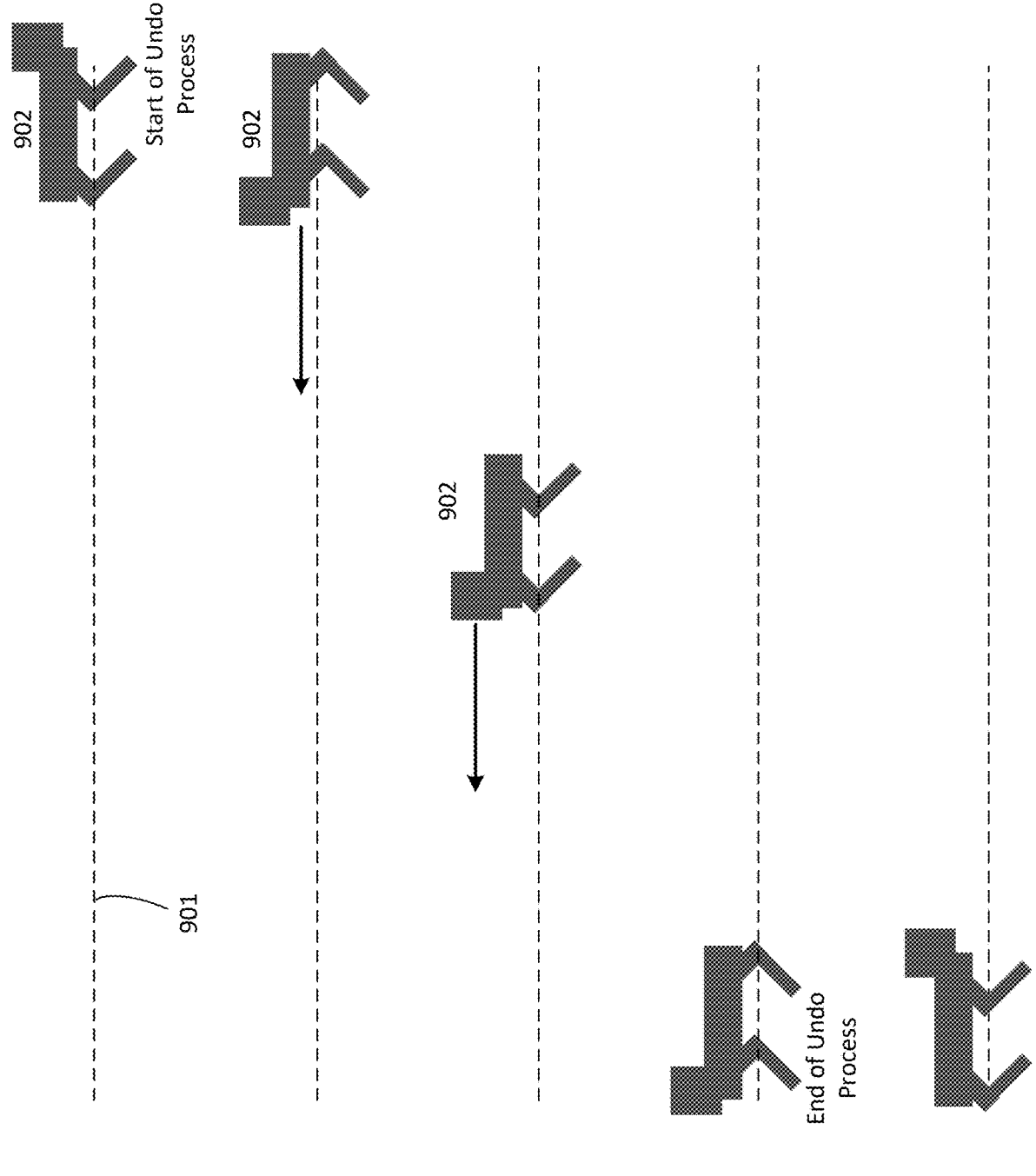
FIGS. 9A-9E depict an example of controlling a robot to move along a route during an undo process, during which the robot turns around and move forwards, according to some embodiments.

In some embodiments, the system performing method 300 may generate operations in act 305 to reorient the robot, then move the robot forwards along the route (which is traversed in reverse during the undo process). Subsequent to the undo process ending, the robot may be reoriented again to face along the route as described below in relation to act 308. For example, the operations generated in act 305 may control a biped or quadruped robot to turn around and walk forward when performing an initial portion of the mission recording in reverse, then to walk forward when performing subsequent portions of the mission recording in reverse. One example of this approach is shown in FIGS. 9A-9E, which depict a quadruped robot 902 controlled to turn around at the start of an undo process and move forwards along a route 901 during the undo process. The robot 902 is controlled to turn around again at the end of the undo process, as shown in FIG. 9E.

Figures 10A, 10B, 10C, 10D, 10E:
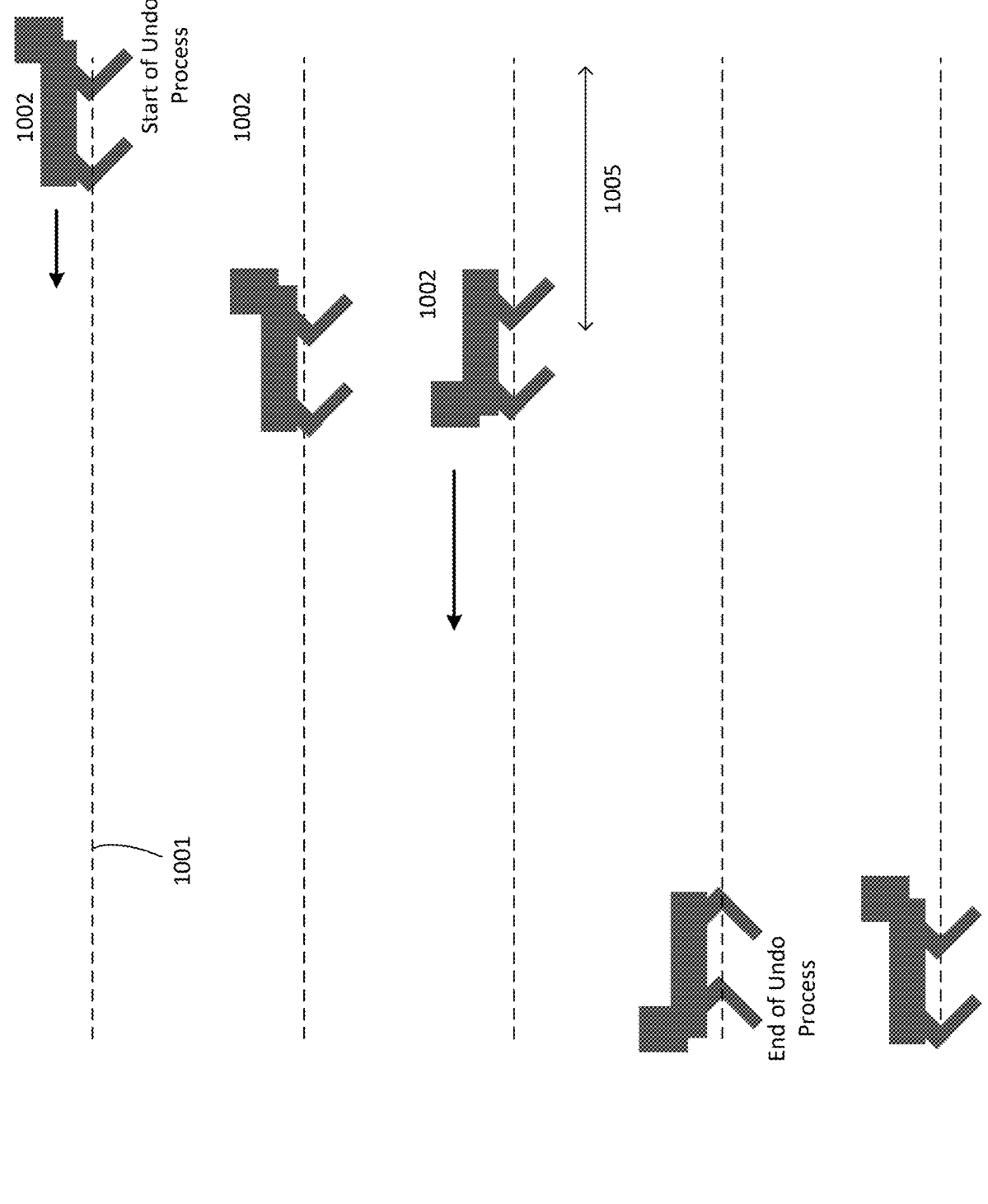
FIGS. 10A-10E depict an example of controlling a robot to move along a route during an undo process, during which the robot initially moves backwards, then turns around and moves forwards, according to some embodiments.

In some embodiments, the system performing method 300 may generate operations in act 305 to move the robot backwards along the route for some amount of time, then if the undo process continues, to reorient the robot then move the robot forwards along the route (which is traversed in reverse during the undo process). The part of the undo process during which the robot moves backwards may be measured based on time (e.g., move backwards for the first 3 seconds, then turn around), or based on distance (e.g., move backwards for the first 5 feet, then turn around). This approach may have an advantage of making a short undo process more efficient than having to turn the robot around every time an undo process occurs. Subsequent to the undo process ending, the robot may be reoriented again to face along the route as described below in relation to act 308. As an example of the above, the operations generated in act 305 may control a biped or quadruped robot to walk backwards along the route when performing an initial portion of the mission recording in reverse, then to turn around and walk forward when performing subsequent portions of the mission recording in reverse. One example of this approach is shown in FIGS. 10A-10E, which depict a quadruped robot 1002 controlled to initially move backwards along a route at the start of an undo process. After moving a distance 1005, the robot 1002 is controlled to turn around and move forwards along the route during the remainder of the undo process. The robot 1002 is controlled to turn around again at the end of the undo process, as shown in FIG. 10E.

As described above, a mission recording may include one or more actions, which are processes performed by the robot that acquire data of some kind. According to some embodiments, one or more operations generated in act 305 may include operations to delete data gathered by one or more actions. The data to be deleted may be stored on the robot and/or may be stored on the system performing method 300. While undoing an action, the robot may be stationary, but may be moved as part of an undo process before and/or after undoing the action. According to some embodiments, the one or more operations generated in act 305 to delete data gathered by one or more actions may only be performed after a waiting period has been completed during which the undo process remains active. To avoid accidental deletion of sensor data during an undo process, for instance, a delay may be introduced into the undo process by the system performing method 300 so that undoing an action takes a fixed amount of time that may be different from (e.g., greater than) an amount of time taken to actually perform the action. For instance, while an undo process is active, the system performing method 300 may wait for 5 seconds before deleting an action and the data associated with it. In some cases, a countdown or other notification may be provided to a user interface to alert a user that deletion of the data will occur if the undo process continues to be active.

Figures 5A, 5B, 5C:
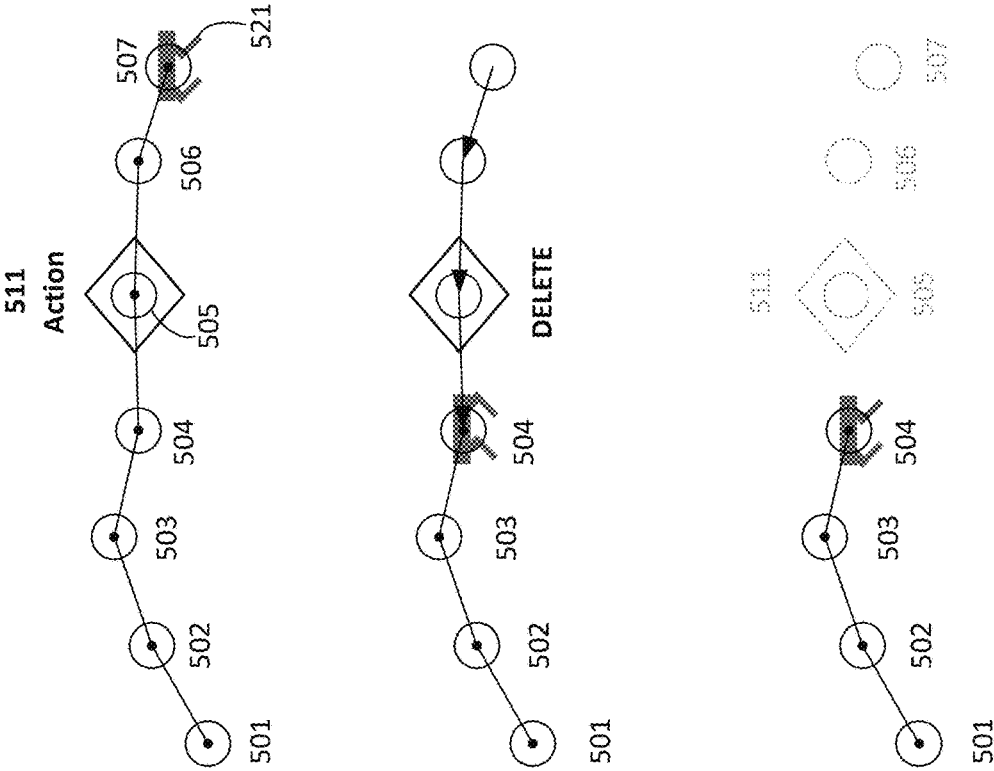
FIGS. 5A-5C depict an example of an undo process for undoing an action associated with a mission recording, according to some embodiments.

An example of an undo process for a mission recording that includes an action is shown in FIGS. 5A-5C, according to some embodiments. In the example of FIG. 5A, an initial mission recording is shown comprising waypoints 501, 502, 503, 504, 505, 506, and 507, with the robot 521 at a location corresponding to waypoint 507. At waypoint 505, an action 511 is performed by the robot 521. Subsequently, an undo process is initiated during which the system performing method 300 may perform successive portions of the initial mission recording in reverse, as described above. In the example of FIG. 5B, the initial mission recording is performed in reverse until the robot reaches waypoint 504, at which point user input is received indicating the undo process is to end. During the undo process, the system performing method 300 may generate an operation in act 305 that deletes data captured at waypoint 505 during the initial mission recording. As described above, during the undo process the system performing method 300 may optionally introduce a delay before deleting the data to avoid accidental deletion of sensor data during the undo process. In the example of FIG. 5C, the corrected mission recording is shown, wherein the waypoints 505, 506 and 507, in addition to action 511, are deleted from the corrected mission recording (or are marked as inactive).

Returning to FIG. 3, in some embodiments a result of controlling the robot to perform the generated operations in act 306 may be to cause the robot to return to an earlier state that the robot was in during the initial mission recording (e.g., after act 302 is performed). For instance, the robot may pass through a sequence of locations, and may have one or more associated poses at each location, while the robot is controlled according to the user input during instances of act 302. At the end of an undo process, the robot may have returned to one of these earlier locations and/or may have an associated pose earlier exhibited at that location, as a result of controlling the robot according to the generated operations during the undo process. In other cases, at the end of an undo process, the robot may have been returned to a slightly different location and/or with a slightly different pose, e.g., due to other steerers being active on the robot, such as an obstacle avoidance steerer, or for any other suitable reason.

In the example of FIG. 3, in act 307 the system performing method 300 determines whether input has been received to end the active undo process. If not, acts 305 and 306 are repeated. As such, the undo process may continue until input is provided to end the undo process. While acts 305 and 306 are shown as separate, sequential acts in the example of FIG. 3, it may be appreciated that each may be simultaneously ongoing during recording of a mission, with operations being generated, for instance, while the robot is being controlled according to already-generated operations. As described above, one way that input may be provided to end the active undo process is by release of a button, the depression of which previously indicated activation of the undo process.

In some embodiments, the system performing method 300 may determine in act 305 that the robot is unable to complete the undo process for some reason, such as because an impassable obstacle is now present along the route previously taken. In this case, the method 300 may be exited and the system may control the robot to move the robot back to the location it was at when the undo process began.

In act 308, subsequent to the completion of an undo process, a corrected mission recording is produced based on the undo process. In some embodiments, producing the corrected mission recording may comprise deleting (or marking inactive) those waypoints passed through by the robot during the undo process (whether actually passed through or used to generate operations to move the robot according to the waypoint locations). As described in some of the examples above, in some cases a new waypoint may be generated at the robot's current location when the undo process ends. In some embodiments, act 308 may include generating a new waypoint at the robot's current location and storing the new waypoint in a corrected mission recording, which is produced in act 309.

Method 300 may optionally include act 309. As described in some of the examples above, in some cases the robot may be repositioned (e.g., reoriented) when the undo process ends. For example, when the robot turns around and moves forward during the undo process, it may be repositioned to face a forward direction when the undo process ends. In some embodiments, act 309 may include reorienting the robot to face in a forward direction, which may for instance be the direction along a line connecting the second to last waypoint to the last waypoint in the corrected mission recording. As further described in some of the above examples, in some cases the robot may be moved further along a route defined by the initial mission recording, despite the undo process ending (e.g., as in the example of FIG. 1C). In some embodiments, act 309 may include moving the robot to the next waypoint along the route after the undo process ends.

FIGS. 6A-6D depict an illustrative example of using a controller to pilot a robot in recording a mission, according to some embodiments. In the example of FIGS. 6A-6D, controller 600 includes joysticks 601 and 602, directional buttons 603, mode buttons 604, bumpers 611 and 612, an undo button 610 and screen 620. According to some embodiments, controller 600 may for instance be a gaming tablet with physical buttons for control of the robot, and may wirelessly communicate with a system that performs method 300 based on input provided from the controller 600. Use of controller 600 as described below may support a WYSI-WYG approach to a mission recording interface while providing undo capabilities, as described above.

In the example of FIGS. 6A-6D, the joysticks 601 and 602 may be used to manually move the robot during the mission. The screen 620 may depict a route taken by the robot 631 so far in the mission. In some embodiments, the screen 620 may show a view from a camera of the robot in addition to the route shown in the example of FIGS. 6A-6D (e.g., with the route shown in inset). In some embodiments, the directional buttons 603 may allow a user to select different cameras on board the robot to be viewed on the screen 620 in this manner. In some embodiments, the waypoints 621, 622, 623 and 624 may not be shown directly on screen 620, but rather only the route taken may be shown on the screen, with the waypoints being recorded to the mission recording. The waypoints are shown in the example of FIGS. 6A-6D, however, for purposes of explanation.

Figure 6A:
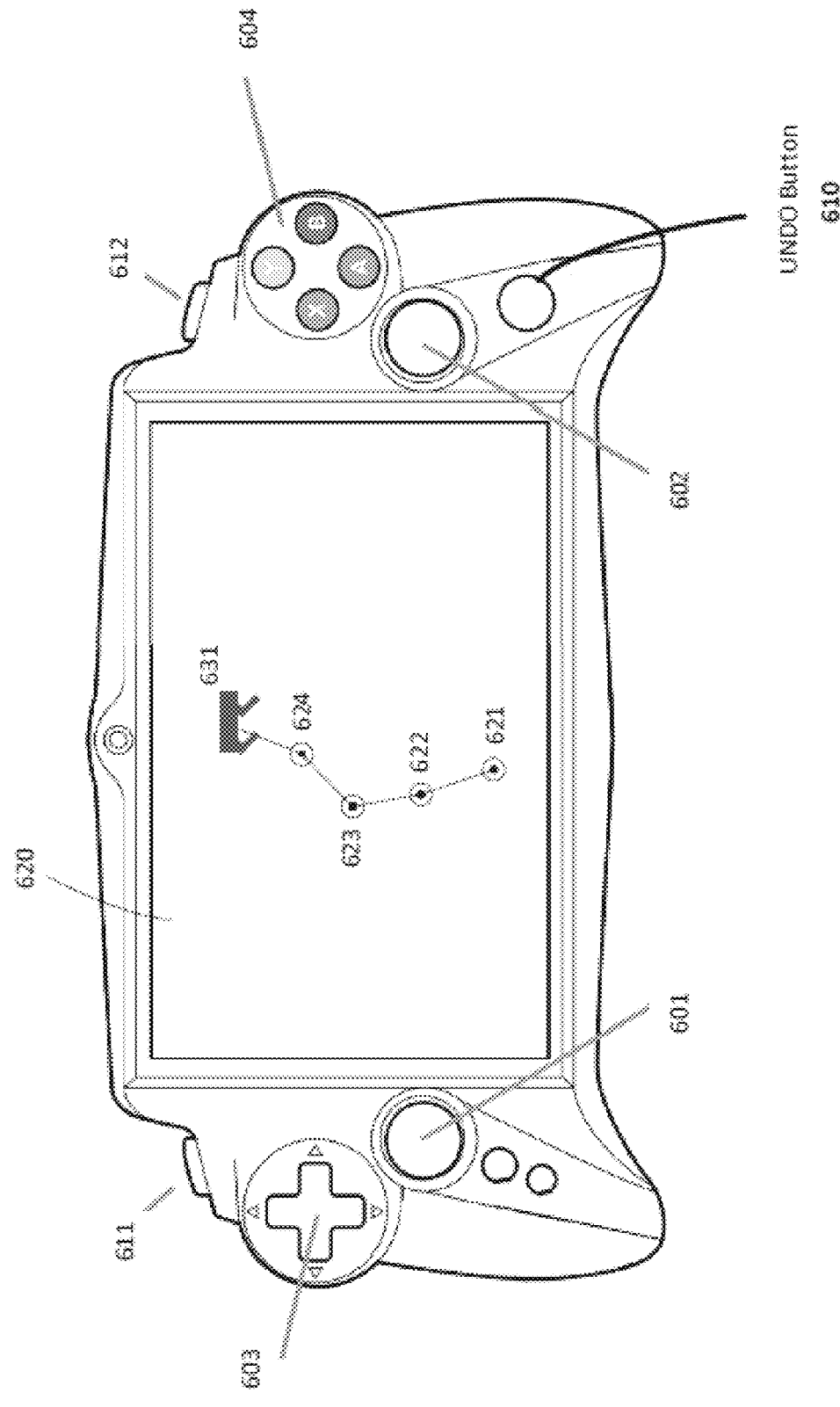
FIGS. 6A-6D depict an example of using a controller to pilot a robot in recording a mission and undoing part of the mission recording, according to some embodiments.
Figure 6B:
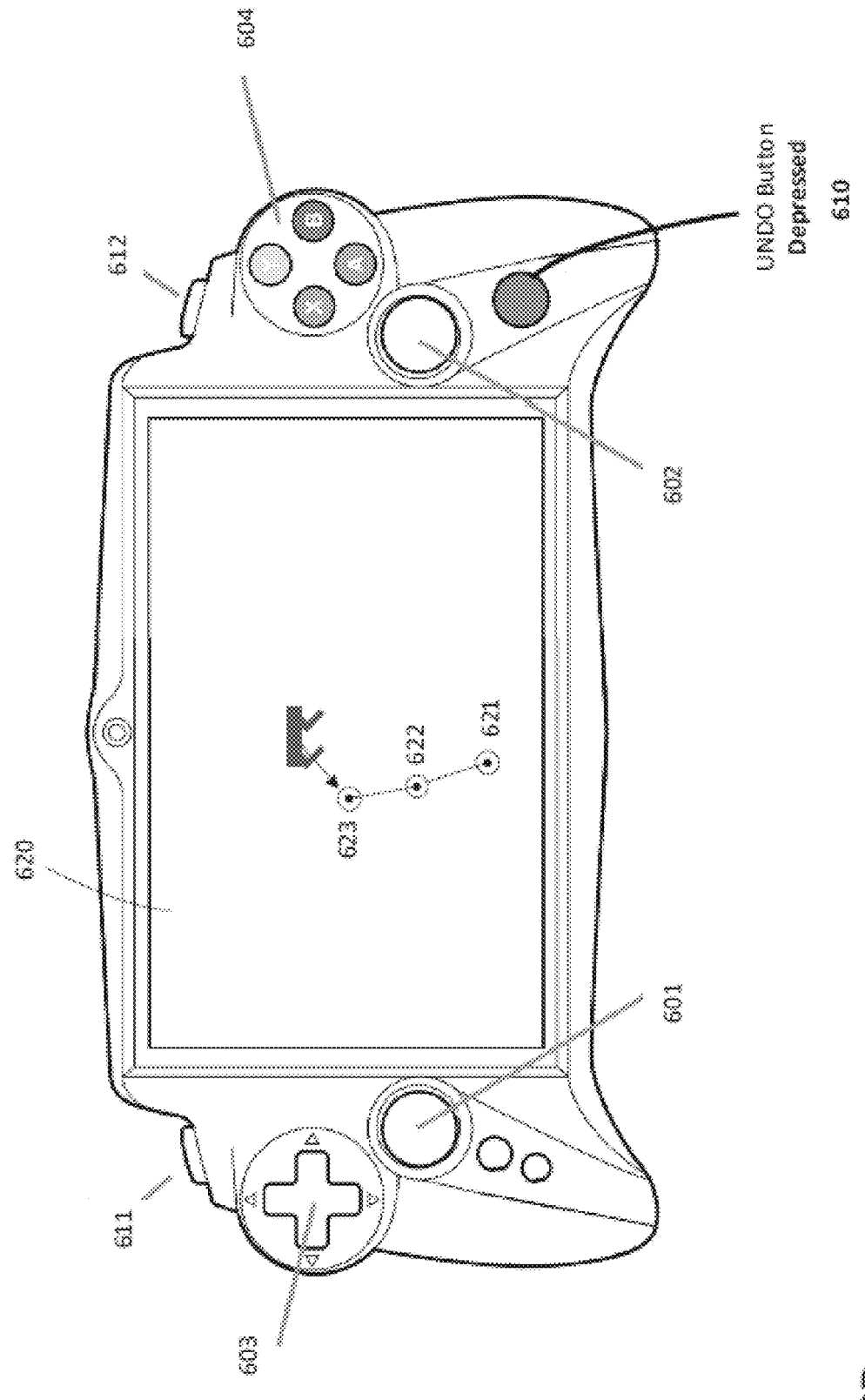

In the example of FIG. 6A, a user has operated the controller 600 to pilot the robot along a route as shown, generating waypoints 621, 622, 623 and 624 in an initial mission recording. Subsequently, as shown in FIG. 6B, the user presses and holds the undo button 610, which initiates the undo process as described above in relation to FIG. 3. The system performing the method 300 may relay data from the robot during the undo process to the controller 600, including image data captured by one or more cameras and/or location information. The controller may present any such data via screen 620 so that the user can view the robot's progress during the undo process.

Figure 6C:
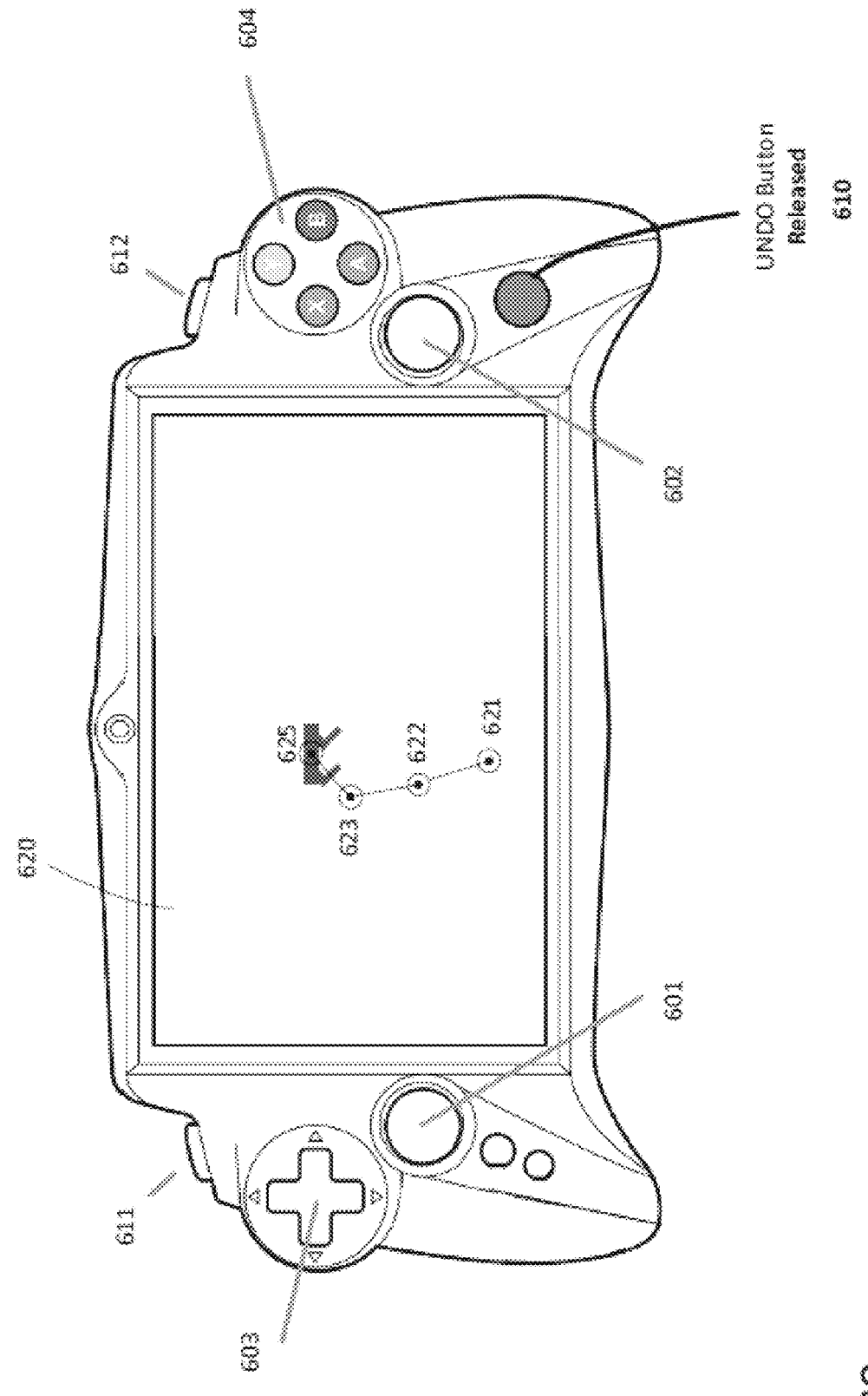
Figure 6D:
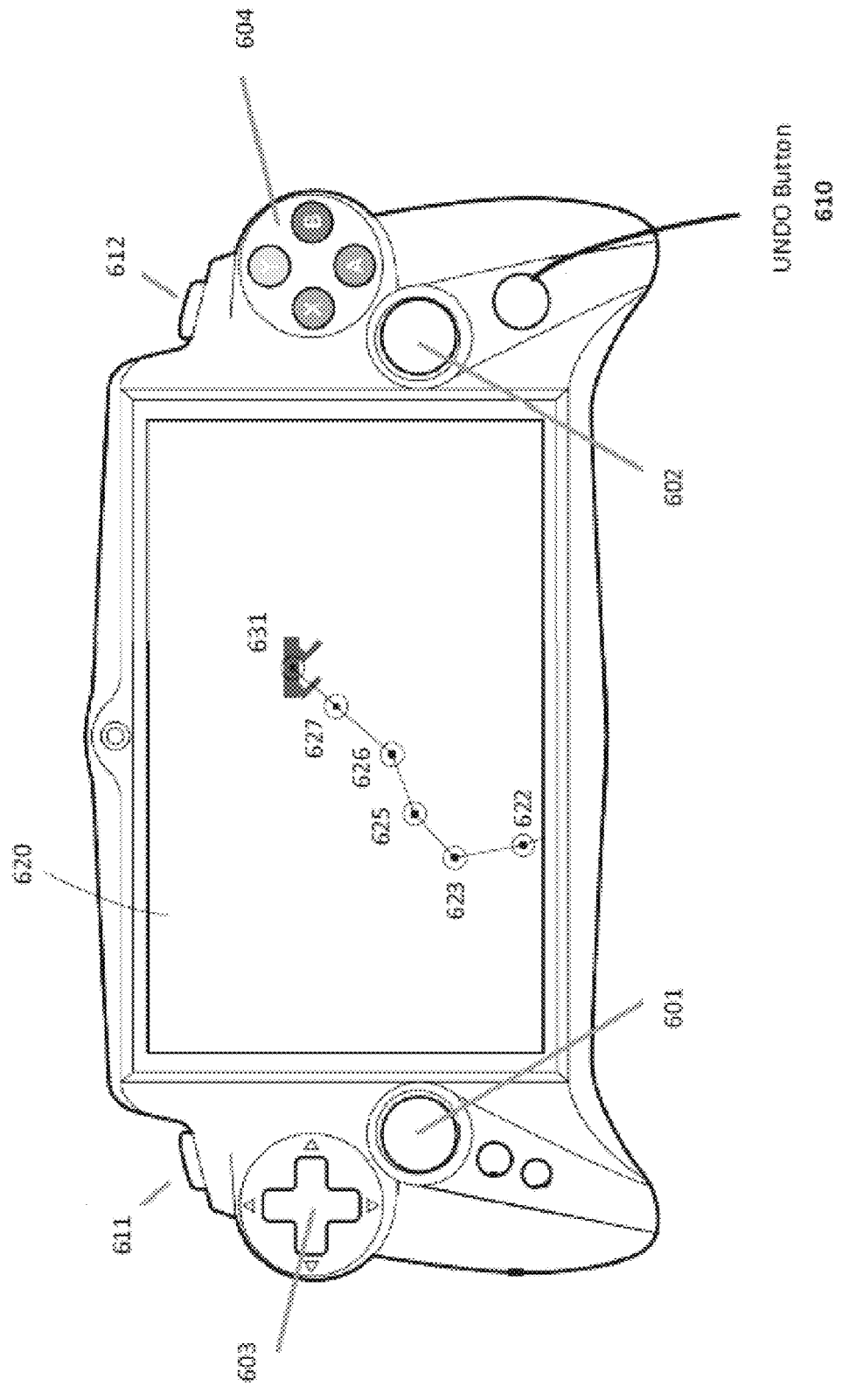

In the example of FIG. 6C, the undo button is released indicating the undo process is to end after the robot has moved back through waypoint 624. A new waypoint 625 is generated representing this location in a corrected mission recording, and this mission recording may be further edited with additional route information (e.g., waypoints 626, 627) by further piloting the robot, as shown in FIG. 6D.

Figure 7:
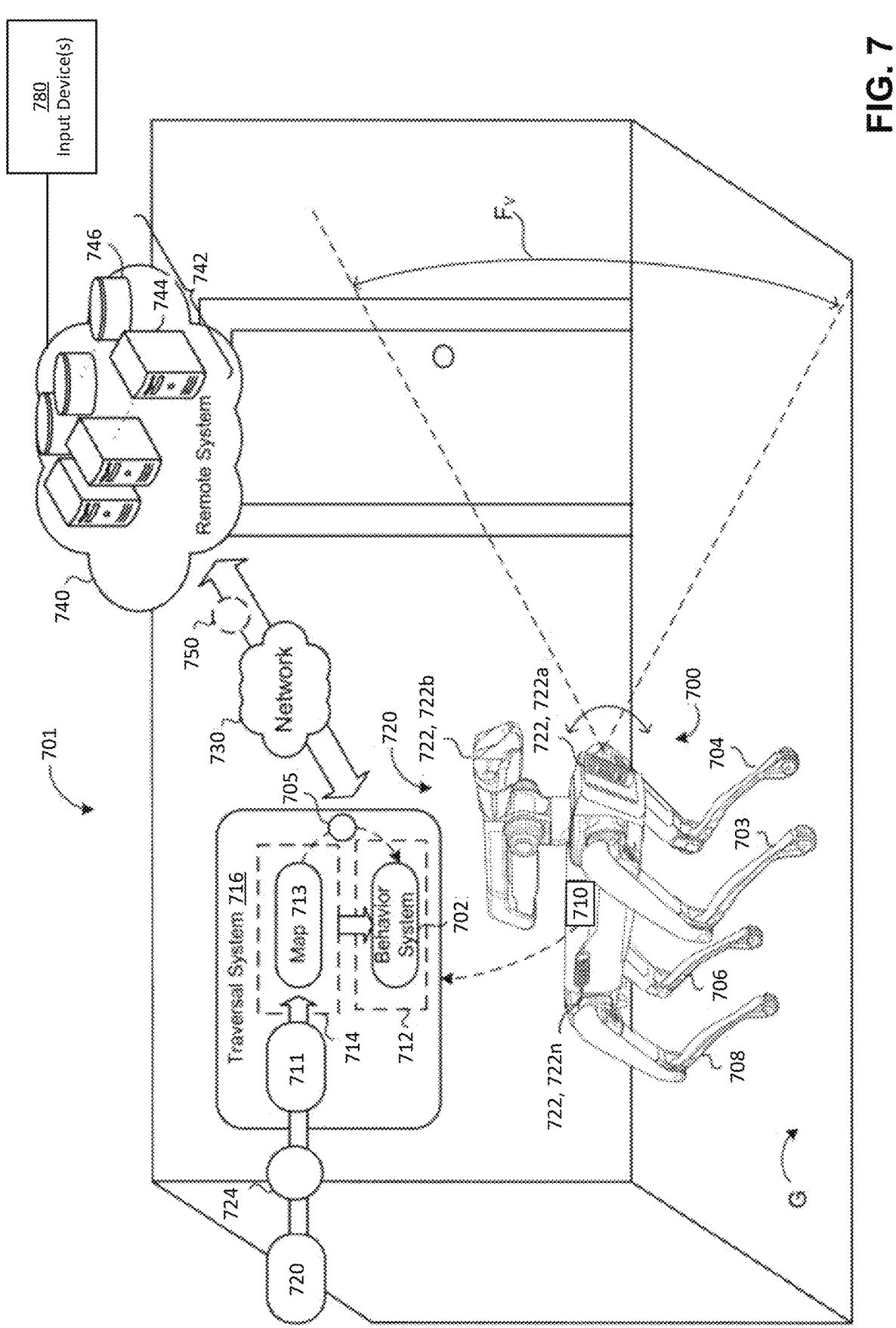
FIG. 7 is a schematic depicting an illustrative example of a system according to some embodiments of the present disclosure.

FIG. 7 is a schematic depicting an illustrative example of a system according to some embodiments of the present disclosure. Environment 701 is a spatial area that may be traversed by a robot 700. In some embodiments, traversal of the robot 700 through the environment 701 may be based at least in part on map data 713. For example, the terrain may include urban terrain, such as buildings, streets, sidewalks, parks, alleys, stairs, ramps, tunnels, etc., rural terrain, such as roads, fields, hills, mountains, caves, etc., subterranean terrain, such as caves, tunnels, etc., or any combination thereof. In the example of FIG. 7, robot 700 includes locomotion based structures such as legs and/or wheels attached to a body that enable the robot to move about the environment 701. Although FIG. 7 depicts a quadruped robot with four legs 703, 704, 706, 708, the robot 700 may include any number of legs or locomotive based structures (e.g., a biped or humanoid robot with two legs) that provides means to traverse environment 701.

According to some embodiments, robot 700 includes computing hardware 710 and at least one sensor system 720. The computing hardware 710 generally includes data processing hardware 712 and memory hardware 714. The computing hardware 710 may be configured to control a robot traversal system 716. The robot traversal system 716 operates a behavior system 702 of the robot 700 to move the robot 700 about the environment 701. The behavior system 702 is generally responsible for controlling (e.g., executing) behaviors of the robot 700. For example, the behavior system 702 may control different footstep patterns, leg patterns, body movement patterns, and/or vision system sensing patterns. The robot traversal system 716 may operate the behavior system 702 based on at least one map 713 provided to the robot traversal system 716.

In the example of FIG. 7, traversal system 716 may be configured to communicate with the memory hardware 714 of the robot 700 to provide the map 713 to operate the behavior system 702 using the data processing hardware 712 of the robot 700. In some examples, the memory hardware 714 stores the map 713 locally on the robot 700. In other examples, the map 713 is stored and/or accessed remotely by the traversal system 716.

In the example of FIG. 7, the traversal system 716 may communicate via a network 730 with a remote system 740. The remote system 740 may be a server or cloud-based environment that includes remote resources 742 such as remote data processing hardware 744 and remote memory hardware 746. In some embodiments, remote system 740 may perform method 300 described above in relation to FIG. 3, and may control the robot 700 during a mission based on user input provided to the remote system 740. The user input may be provided to the remote system 740 from input device(s) 780, which may for example include the controller 600 described above in relation to FIGS. 6A-6D.

In the example of FIG. 7, sensor system 720 includes one or more sensors 722, 722 a-n. The sensors 722 may include vision/image sensors, inertial sensors (e.g., an inertial measurement unit (IMU)), and/or kinematic sensors. Some examples of sensors 722 include a camera such as a stereo camera, a scanning light-detection and ranging (LIDAR) sensor, or a scanning laser-detection and ranging (LADAR) sensor. In some examples, the sensor 722 has a corresponding field(s) of view $F_v$ defining a sensing range or region corresponding to the sensor 722. For instance, FIG. 7 depicts a field of a view $F_v$ for the robot 700. Each sensor 722 may be pivotable and/or rotatable such that the sensor 722 may, for example, change the field of view $F_v$ about one or more axis (e.g., an x-axis, a y-axis, or a z-axis in relation to a ground plane G). In some implementations, the body of the robot 700 includes a sensor system 720 with multiple sensors 722 about the body to gather sensor data 724 in all directions around the robot 700. For example, the quadruped robot depicted in FIG. 7 includes a sensor 722 on its chest 722a, a sensor 722 on each side 722n (only one side depicted), and a sensor 722 on its retractable hand 722b. The robot 700 may include any number of sensors 722 as part of the sensor system 720 in order to generate sensor data 724 for the environment 701 about the robot 700.

When surveying a field of view $F_v$ with a sensor 722, the sensor system 720 generates sensor data 724 corresponding to the field of view Fr. In some examples, the sensor data 724 is image data that corresponds to a three-dimensional volumetric point cloud generated by a three-dimensional volumetric image sensor 722. Additionally or alternatively, when the robot 700 is maneuvering about the environment 701, the sensor system 720 gathers pose data for the robot 700 that includes inertial measurement data (e.g., measured by an IMU). In some examples, the pose data includes kinematic data and/or orientation data about the robot 700.

Sensor data 724 gathered by the sensor system 720, such as the image data, pose data, inertial data, kinematic data, etc., relating to the environment 701 may be communicated to the computing hardware 710 (e.g., the data processing hardware 712 and memory hardware 714) of the robot 700. In some examples, the sensor system 720 gathers and stores the sensor data 724 (e.g., in the memory hardware 714 or memory hardware 746 of remote resources 742). In other examples, the sensor system 720 gathers the sensor data 724 in real-time and processes the sensor data 724 without storing raw (i.e., unprocessed) sensor data 724. In yet other examples, the computing hardware 710 and/or remote resources 742 store both the processed sensor data 724 and raw sensor data 124.

Having described several aspects of at least one embodiment of this technology, it is to be appreciated that various alterations, modifications, and improvements will readily occur to those skilled in the art.

Such alterations, modifications, and improvements are intended to be part of this disclosure, and are intended to be within the spirit and scope of the technology. Further, though advantages of the present technology are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Various aspects of the present technology may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the present technology may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising:
   generating, using at least one processor, a first set of data indicating a first traversal of a first portion of a navigation route by a robot based on performance of one or more first operations, wherein performance of a mission to execute a second traversal of the navigation route causes the robot to perform the one or more first operations, wherein the navigation route comprises one or more waypoints and one or more actions for performance by the robot at the one or more waypoints;
   determining, using the at least one processor, one or more second operations;
   instructing, using the at least one processor, movement of two or more legs of the robot to perform the one or more second operations, wherein, based on performance of a first subset of the one or more second operations, at least a portion of the first set of data is disassociated from the mission;
   generating, using the at least one processor, a second set of data indicating a first traversal of a second portion of the navigation route based on performance of a second subset of the one or more second operations; and
   instructing, using the at least one processor, the robot to perform the mission to execute the second traversal of the navigation route, wherein the performance of the mission to execute the second traversal of the navigation route causes the robot to perform the second subset of the one or more second operations.

2. The method of claim 1, wherein the at least a portion of the first set of data comprises a first portion of the first set of data, wherein the performance of the mission to execute the second traversal of the navigation route further causes the robot to navigate an environment based on the second set of data and a second portion of the first set of data.

3. The method of claim 1, wherein instructing the performance of the mission comprises:
   instructing the robot to navigate from a first waypoint of the one or more waypoints as indicated by the first set of data to a second waypoint of the one or more waypoints as indicated by the second set of data.

4. The method of claim 1, wherein the first set of data indicates a transition of the robot from a first state to a second state, and wherein, based on the performance of the first subset of the one or more second operations, the robot transitions from the second state to the first state.

5. The method of claim 1, wherein the first set of data indicates a movement of the robot such that a first portion of the robot precedes a second portion of the robot along the navigation route, and wherein the movement of the two or more legs causes one or more of a movement of the robot such that the second portion precedes the first portion along the navigation route or a turning around of the robot and a movement of the robot such that the first portion precedes the second portion along the navigation route.

6. The method of claim 1, wherein generating the first set of data is based on a command to move from a first location to a second location, and wherein the performance of the first subset of the one or more second operations causes the robot to move from the second location to the first location.

7. The method of claim 1, further comprising:
   receiving a plurality of commands associated with the robot; and
   instructing the performance of the one or more first operations by the robot based on the plurality of commands, wherein generating the first set of data is based on instructing the performance of the one or more first operations.

8. The method of claim 1, further comprising:
   receiving, from a user computing device, a first user input, wherein instructing the movement of the two or more legs is in response to receiving the first user input;
   receiving, from the user computing device, a second user input; and
   identifying the at least a portion of the first set of data to be disassociated from the mission based on the first user input and the second user input.

9. The method of claim 1, wherein the first set of data indicates the one or more actions, the one or more waypoints, and data gathered based on performance of the one or more actions, wherein an action of the one or more actions, a waypoint of the one or more waypoints, and at least a portion of the data gathered based on the performance of the one or more actions are disassociated from the mission based on the performance of the first subset of the one or more second operations, and wherein the performance of the first subset of the one or more second operations causes deletion of the at least a portion of the data gathered based on the performance of the one or more actions.

10. The method of claim 1, further comprising:
   instructing movement of the robot to reposition according to the first set of data based on instructing the movement of the two or more legs.

11. The method of claim 1, further comprising:

determining that the robot is unable to successfully perform at least a portion of the one or more second operations; and instructing movement of the robot to a location associated with the first set of data in response to determining that the robot is unable to successfully perform the at least a portion of the one or more second operations.

12. The method of claim 1, wherein the at least a portion of the first set of data indicates a first operation, and wherein the performance of the mission to execute the second traversal of the navigation route does not include performance of the first operation.

13. The method of claim 1, wherein the mission is defined according to mission data, wherein the mission data comprises the first set of data and an indication that the at least a portion of the first set of data has been disassociated from the mission.

14. The method of claim 1, further comprising:

subsequent to the movement of the two or more legs, instructing performance of one or more additional actions by the robot, wherein the one or more additional actions are not described by the first set of data; and adding the one or more additional actions to the navigation route.

15. A system comprising:

at least one processor; and at least one non-transitory computer readable medium comprising instructions, wherein execution of the instructions by the at least one processor causes the at least one processor to:

generate a first set of data indicating a first traversal of a first portion of a navigation route by a robot based on performance of one or more first operations, wherein performance of a mission to execute a second traversal of the navigation route causes the robot to perform the one or more first operations, wherein the navigation route comprises one or more waypoints and one or more actions for performance by the robot at the one or more waypoints;

determine one or more second operations;

instruct movement of two or more legs of the robot to perform the one or more second operations, wherein, based on performance of a first subset of the one or more second operations, at least a portion of the first set of data is disassociated from the mission;

generate a second set of data indicating a first traversal of a second portion of the navigation route based on performance of a second subset of the one or more second operations; and instruct the robot to perform the mission to execute the second traversal of the navigation route, wherein the performance of the mission to execute the second traversal of the navigation route causes the robot to perform the second subset of the one or more second operations.

16. The system of claim 15, wherein the at least a portion of the first set of data comprises a first portion of the first set of data, wherein the performance of the mission to execute the second traversal of the navigation route further causes the robot to navigate an environment based on the second set of data and a second portion of the first set of data.

17. The system of claim 15, wherein to instruct the performance of the mission, the execution of the instructions by the at least one processor further causes the at least one processor to:

instruct the robot to navigate from a first waypoint of the one or more waypoints as indicated by the first set of data to a second waypoint of the one or more waypoints as indicated by the second set of data.

18. The system of claim 15, wherein the first set of data indicates a transition of the robot from a first state to a second state, and wherein, based on the performance of the first subset of the one or more second operations, the robot transitions from the second state to the first state.

19. The system of claim 15, wherein generating the first set of data is based on a command to move from a first location to a second location, and wherein the performance of the first subset of the one or more second operations causes the robot to move from the second location to the first location.

20. The system of claim 15, wherein the execution of the instructions by the at least one processor further causes the at least one processor to:

receive, from a user computing device, a first user input, wherein instructing the movement of the two or more legs is in response to receiving the first user input;

receive, from the user computing device, a second user input; and identify the at least a portion of the first set of data to be disassociated from the mission based on the first user input and the second user input.

21. The system of claim 15, wherein the first set of data indicates the one or more actions, the one or more waypoints, and data gathered based on performance of the one or more actions, wherein an action of the one or more actions, a waypoint of the one or more waypoints, and at least a portion of the data gathered based on the performance of the one or more actions are disassociated from the mission based on the performance of the first subset of the one or more second operations, and wherein the performance of the first subset of the one or more second operations causes deletion of the at least a portion of the data gathered based on the performance of the one or more actions.

22. The system of claim 15, wherein the execution of the instructions by the at least one processor further causes the at least one processor to:

determine that the robot is unable to successfully perform at least a portion of the one or more second operations; and instruct movement of the robot to a location associated with the first set of data in response to determining that the robot is unable to successfully perform the at least a portion of the one or more second operations.

23. The system of claim 15, wherein the at least a portion of the first set of data indicates a first operation, and wherein the performance of the mission to execute the second traversal of the navigation route does not include performance of the first operation.

24. The system of claim 15, wherein the mission is defined according to mission data, wherein the mission data comprises the first set of data and an indication that the at least a portion of the first set of data has been disassociated from the mission.

25. The method of claim 1, wherein the first set of data indicates a first waypoint, a second waypoint, a first edge between the first waypoint and the second waypoint, and a first action associated with the second waypoint, and wherein, based on the performance of the first subset of the one or more second operations, the second waypoint, the first edge, and the first action are disassociated from the mission.

26. The method of claim 25, wherein the second set of data indicates a third waypoint, and wherein the performance of the mission to execute the second traversal of the navigation route causes the robot to navigate to the first waypoint, navigate from the first waypoint to the third waypoint via a second edge, and perform a second action associated with the third waypoint.

27. The method of claim 1, further comprising:
defining the navigation route based on the performance of the first subset of the one or more second operations and the performance of the second subset of the one or more second operations,
wherein instructing the robot to perform the mission to execute the second traversal of the navigation route comprises:
subsequent to defining the navigation route, instructing autonomous performance of the mission to execute the second traversal of the navigation route by the robot as defined based on the performance of the first subset of the one or more second operations and the performance of the second subset of the one or more second operations.

28. The method of claim 1, further comprising:
instructing a set of autonomous performances of the mission to execute subsequent traversals of the navigation route by the robot according to the second set of data.

* * * * *